(12) United States Patent
Yoshihiro et al.

(10) Patent No.: US 11,015,047 B1
(45) Date of Patent: May 25, 2021

(54) MOLDINGS OF FIBER-REINFORCED THERMOPLASTIC RESIN

(71) Applicant: TORAY INDUSTRIES, INC., Tokyo (JP)

(72) Inventors: Kazuki Yoshihiro, Nagoya (JP); Yuki Mitsutsuji, Nagoya (JP); Atsuki Tsuchiya, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/638,573

(22) PCT Filed: Sep. 3, 2018

(86) PCT No.: PCT/JP2018/032554
§ 371 (c)(1),
(2) Date: Feb. 12, 2020

(87) PCT Pub. No.: WO2019/049816
PCT Pub. Date: Mar. 14, 2019

(30) Foreign Application Priority Data

Sep. 5, 2017 (JP) .............................. JP2017-169953

(51) Int. Cl.
*C08L 23/12* (2006.01)
(52) U.S. Cl.
CPC .................................. *C08L 23/12* (2013.01)
(58) Field of Classification Search
CPC ....................................................... C08L 23/12
See application file for complete search history.

(56) References Cited

U.S. PATENT DOCUMENTS

| 2006/0068141 A1 | 3/2006 | Tsutsumi et al. |
| 2015/0291789 A1 | 10/2015 | Hirata et al. |

(Continued)

FOREIGN PATENT DOCUMENTS

| JP | 6-285855 A | 10/1994 |
| JP | 2006-124647 A | 5/2006 |

(Continued)

OTHER PUBLICATIONS

International Search Report, issued in PCT/JP2018/032554, PCT/ISA/210, dated Dec. 4, 2018.

(Continued)

*Primary Examiner* — Arrie L Reuther
(74) *Attorney, Agent, or Firm* — Birch, Stewart, Kolasch & Birch, LLP

(57) ABSTRACT

To provide a fiber reinforced thermoplastic resin molded article having excellent impact strength and flexural strength, provided is a fiber reinforced thermoplastic resin molded article, including: a carbon fiber (A), an organic fiber (B) having a strand strength of 1500 MPa or more and, a thermoplastic resin (C), wherein the fiber reinforced thermoplastic resin molded article contains 5 to 45 parts by weight of the carbon fiber (A), 1 to 45 parts by weight of the organic fiber (B), and 20 to 94 parts by weight of the thermoplastic resin (C) with respect to 100 parts by weight of the total of the carbon fiber (A), the organic fiber (B), and the thermoplastic resin (C), wherein a ratio ($L_{co}/l_{no}$) of the critical fiber length $L_{co}$ of the organic fiber (B) to the number average fiber length $l_{no}$ of the organic fiber (B) is 0.9 or more and 2.0 or less, and wherein an interfacial shear strength between the organic fiber (B) and the thermoplastic resin (C) is 3.0 MPa or more and 50 MPa or less.

10 Claims, 4 Drawing Sheets

(56) References Cited

U.S. PATENT DOCUMENTS

2018/0305507 A1   10/2018   Mitsutsuji et al.
2018/0312648 A1   11/2018   Mitsutsuji et al.

FOREIGN PATENT DOCUMENTS

| JP | 2014-62143 A | 5/2006 |
| JP | 2009-24057 A | 2/2009 |
| JP | 2009-114332 A | 5/2009 |
| JP | 2013-14687 A | 1/2013 |
| JP | 2015-143339 A | 8/2015 |
| JP | 2015-178610 A | 10/2015 |
| JP | 2016-74779 A | 5/2016 |
| WO | WO 2014/098103 A1 | 6/2014 |
| WO | WO 2017/073482 A1 | 5/2017 |
| WO | WO 2017/073483 A1 | 5/2017 |
| WO | WO 2019/031288 A1 | 2/2019 |

OTHER PUBLICATIONS

Written Opinion of the International Searching Authority, issued in PCT/JP2018/032554, PCT/ISA/237, dated Dec. 4, 2018.

[Fig. 1]
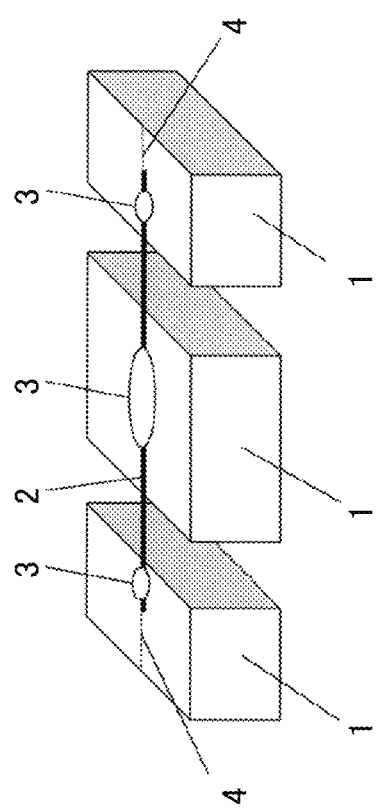

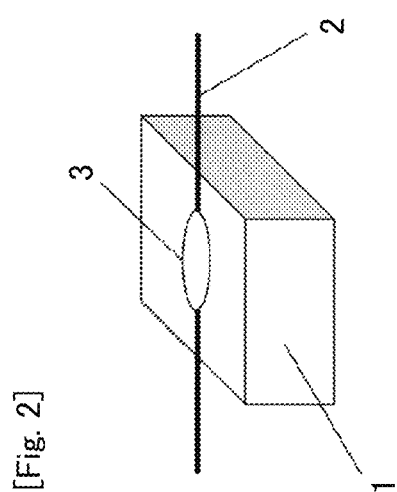
[Fig. 2]

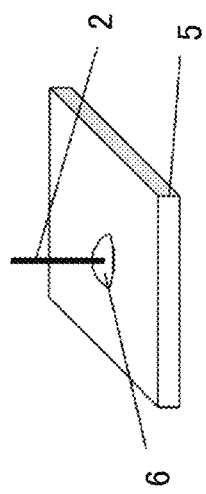
[Fig. 3]

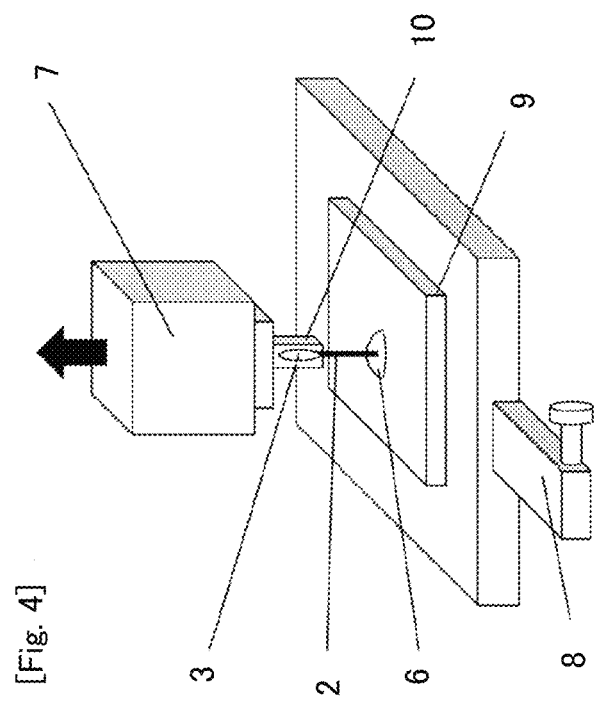
[Fig. 4]

MOLDINGS OF FIBER-REINFORCED THERMOPLASTIC RESIN

TECHNICAL FIELD

The present invention relates to fiber reinforced thermoplastic resin molded articles.

BACKGROUND ART

Molded articles containing a reinforcement fiber and a thermoplastic resin are light in weight, have excellent mechanical properties, and thus, are widely used in sports goods applications, aerospace applications, general industry applications, and the like. Examples of reinforcement fibers to be used for these molded articles include: metal fibers such as aluminum fibers and stainless steel fibers; inorganic fibers such as silicon carbide fibers and carbon fibers; organic fibers such as aramid fibers and poly(paraphenylenebenzoxazole) (PBO) fibers; and the like. A carbon fiber is suitable from the viewpoint of a balance among specific strength, specific stiffness, and lightness.

A carbon fiber has excellent specific strength and specific stiffness, and thus, molded articles reinforced with a carbon fiber have excellent lightness and mechanical properties. Because of this, such molded articles are widely used in various fields such as electronic equipment housings and automobile members. However, molded articles are required to be even lighter and thinner in the above-mentioned applications, and in particular, molded articles such as housings are required to have even higher mechanical properties (in particular, flexural strength and impact characteristics).

Examples of proposed means for enhancing the impact characteristics of a carbon fiber reinforced thermoplastic resin molded article include a long fiber reinforced composite resin composition containing an olefinic resin, an organic long fiber, and a carbon fiber (see, for example, Patent Literature 1). In addition, composite fiber reinforced thermoplastic resin pellets are proposed as pellets having excellent stiffness and impact resistance, wherein the composite fiber reinforced thermoplastic resin pellets contain a thermoplastic resin and two or more selected from organic fibers and carbon fibers, and wherein the fibers are present in a twisted state and coexist with the thermoplastic resin (see, for example, Patent Literature 2). In addition, a fiber reinforced thermoplastic resin molded article containing a carbon fiber, an organic fiber, and a thermoplastic resin is proposed as a fiber reinforced thermoplastic resin molded article having excellent impact strength and low temperature impact strength, wherein the carbon fiber and the organic fiber each have an average fiber length in a specific range, and further, wherein, in the carbon fiber and the organic fiber, the average straight-line distance between two edges of a single fiber and the average fiber length are in a specific relationship (see, for example, Patent Literature 3).

CITATION LIST

Patent Literature

Patent Literature 1: JP2009-114332A
Patent Literature 2: JP2009-24057
Patent Literature 3: WO2014/098103

SUMMARY OF INVENTION

Technical Problem

However, the technologies described in Patent Literature 1 to 3 afford still insufficient mechanical properties, particularly flexural strength and impact strength. Thus, conventional technologies for fiber reinforced thermoplastic resin molded articles whose matrix is a thermoplastic resin do not afford a fiber reinforced thermoplastic resin molded article that achieves high mechanical properties, particularly both flexural strength and impact strength. There is a demand for development of such a fiber reinforced thermoplastic resin molded article. In view of the above-mentioned problems posed by conventional technologies, an object of the present invention is to provide a fiber reinforced thermoplastic resin molded article having excellent mechanical properties (in particular, impact strength and flexural strength).

Solution to Problem

To solve the problems, the present invention mainly has the following constituents.

A fiber reinforced thermoplastic resin molded article, comprising: a carbon fiber (A), an organic fiber (B) having a strand strength of 1500 MPa or more and, a thermoplastic resin (C), wherein the fiber reinforced thermoplastic resin molded article contains 5 to 45 parts by weight of the carbon fiber (A), 1 to 45 parts by weight of the organic fiber (B), and 20 to 94 parts by weight of the thermoplastic resin (C) with respect to 100 parts by weight of the total of the carbon fiber (A), the organic fiber (B), and the thermoplastic resin (C), wherein a ratio ($L_{co}/l_{no}$) of the critical fiber length $L_{co}$ of the organic fiber (B) to the number average fiber length $l_{no}$ of the organic fiber (B) is 0.9 or more and 2.0 or less, and wherein an interfacial shear strength between the organic fiber (B) and the thermoplastic resin (C) is 3.0 MPa or more and 50 MPa or less.

Advantageous Effects of Invention

A fiber reinforced thermoplastic resin molded article according to the present invention contains a carbon fiber, an organic fiber, a thermoplastic resin, wherein the ratio $L_{co}/l_{no}$ of the organic fiber and the interfacial shear strength between the organic fiber and the thermoplastic resin are each brought within a specific range. This results in making it possible to obtain a molded article which allows more energy to be absorbed thanks to the pull-out of organic fiber when the molded article undergoes an impact, and which thus achieves high flexural strength and impact strength. Such a molded article can be obtained by using a fiber reinforce thermoplastic resin molding material according to the present invention. Then, such a molded article is very useful for electrical and electronic equipment, OA equipment, home electrical appliances, housings, automobile parts, and the like.

BRIEF DESCRIPTION OF DRAWINGS

FIG. 1 is a schematic view depicting an example of a first step in which a single fiber is adhered, in straight form, to a fixing jig in adhesion evaluation in Examples and Comparative Examples.

FIG. 2 is a schematic view depicting an example of a single fiber adhered to a fixing jig in adhesion evaluation in Examples and Comparative Examples.

FIG. 3 is a schematic view depicting an example of an adhesion evaluation sample in a second step in Examples and Comparative Examples.

FIG. 4 is a schematic view depicting an example of a single fiber pull-out test in a third step in adhesion evaluation in Examples and Comparative Examples.

DESCRIPTION OF EMBODIMENTS

A fiber reinforced thermoplastic resin molded article according to the present invention (hereinafter referred to as a "molded article" for short) contains at least a carbon fiber (A), an organic fiber (B), and a thermoplastic resin (C).

Frictional resistance experienced by fiber pull-out is one of the factors that contribute to absorption of impact energy resulting from an impact undergone by a fiber reinforced thermoplastic resin molded article. More specifically, a molded article that has undergone impact generates cracking, which fractures fibers and advances linearly to incur brittle breaking. On the other hand, if the generated cracking changes its direction at the interface with the fibers and thus causes the fibers to be more easily pulled out of the thermoplastic resin, frictional resistance experienced by the fiber pull-out allows the impact energy to be absorbed more easily.

The present inventors have found that a specific ratio of the critical fiber length ($L_{co}$) of an organic fiber (B) to the number average fiber length ($l_{no}$) of an organic fiber in a molded article causes fiber pull-out resulting from interfacial debonding to occur more preferentially in material breaking caused by the impact on the molded article than the fiber fracture of the organic fiber. The present inventors have further discovered that friction caused by fiber pull-out at the interface between organic fiber and resin increases the amount of impact energy absorption and enhances the impact strength of the molded article. In addition, the present inventors have discovered that a thermoplastic resin and an organic fiber (B) which have a specific range of interfacial shear strength therebetween contribute to enhancing the static mechanical strength such as the flexural strength of the molded article.

As above-mentioned, the present inventors have discovered that high flexural strength and high impact strength are both achieved for a molded article by allowing the critical fiber length ($L_{co}$) of the organic fiber and the number average fiber length ($l_{no}$) of the organic fiber in the molded article to be each in a specific range, and allowing the interfacial shear strength between the thermoplastic resin (C) and the organic fiber (B) to be in a specific range.

<Carbon Fiber (A)>

A carbon fiber (A) according to the present invention has a fiber reinforcement effect on a thermoplastic resin (C), which can thus have higher mechanical properties. If a carbon fiber has unique characteristics such as electrical conductivity and thermal conductivity, such a carbon fiber can give a molded article these properties, which cannot be given by only the thermoplastic resin (C).

The carbon fiber is not limited to any particular one, and examples thereof include PAN carbon fibers, pitch carbon fibers, rayon carbon fibers, cellulosic carbon fibers, vapor-grown carbon fibers, graphitized fibers thereof, and the like. A PAN carbon fiber is a carbon fiber the raw material of which is a polyacrylonitrile fiber. A pitch carbon fiber is a carbon fiber the raw material of which is petroleum tar or petroleum pitch. A cellulosic carbon fiber is a carbon fiber the raw material of which is viscose rayon, cellulose acetate, or the like. A vapor-grown carbon fiber is a carbon fiber the raw material of which is hydrocarbon or the like.

Furthermore, preferable carbon fibers are ones which have a surface oxygen concentration [O/C] of 0.05 to 0.5 as an atomicity ratio of oxygen (O) to carbon (C) in the fiber surface, as measured by X-ray photoelectron spectroscopy. A surface oxygen concentration of 0.05 or more makes it possible to secure a sufficient amount of functional group in the surface of the carbon fiber, which can thus obtain strong adhesion to the thermoplastic resin (C), and accordingly, further enhances the flexural strength and tensile strength of the molded article. The surface oxygen concentration is more preferably 0.08 or more, still more preferably 0.1 or more. In addition, the upper limit of the surface oxygen concentration is not limited to any particular value, and is generally preferably 0.5 or less from the viewpoint of a balance between the handling and productivity of a carbon fiber. The surface oxygen concentration is more preferably 0.4 or less, still more preferably 0.3 or less.

The surface oxygen concentration of a carbon fiber can be determined by X-ray photoelectron spectroscopy in the following manner. First, if any sizing agent or the like is adhered on the surface of the carbon fiber, the sizing agent or the like is removed with a solvent. The carbon fiber filament is cut into pieces each having a length of 20 mm, and the pieces are spread and arranged on a copper-made sample support table. Subsequently, the inside of a sample chamber is kept at $1 \times 10^{-8}$ Torr using AlKα1 or AlKα2 as an X-ray source. As a value for the correction of a peak which should be carried out due to the occurrence of electrostatic charging during the measurement, the kinetic energy value (K.E.) of the main peak of $C_{1s}$ is set to 1202 eV. The Cis peak area is determined by drawing, as K.E., a linear baseline in a range of from 1191 to 1205 eV. The $O_{1s}$ peak area is determined by drawing, as K.E., a linear base line in a range of from 947 to 959 eV.

Here, the surface oxygen concentration [O/C] is calculated as an atomicity ratio from the ratio of the $O_{1s}$ peak area to the Cis peak area using a sensitivity correction value inherent to a device. A model ES-200 device manufactured by Kokusai Electric Inc. is used as an X-ray photoelectron spectroscopy device, and a sensitivity correction value of 1.74 is used.

Examples of means for adjusting the surface oxygen concentration [O/C] to 0.05 to 0.5 include, but are not limited particularly to, techniques such as an electrolytic oxidation treatment, a chemical oxidation treatment, and a gas phase oxidation treatment. Among these, an electrolytic oxidation treatment is preferable.

The average fiber diameter of the carbon fiber (A) is not limited to any particular value, and is preferably 1 to 20 μm, more preferably 3 to 15 μm, from the viewpoint of the mechanical properties and surface appearance of a molded article. To form a carbon fiber bundle, the number of single fibers therein is, without particular limitation, preferably 100 to 350,000, and more preferably 20,000 to 100,000 from the viewpoint of productivity.

For the purpose of enhancing adhesion between the carbon fiber (A) and the thermoplastic resin (C) or other purposes, the surface of the carbon fiber may be treated. Examples of methods of treating the surface include an electrolytic treatment, an ozonation treatment, an UV treatment, and the like.

For the purpose of preventing the fluffing of the carbon fiber, enhancing the adhesion between the carbon fiber and the thermoplastic resin (C), or other purposes, a sizing agent may be applied to the carbon fiber. Applying a sizing agent makes it possible to enhance the surface properties of the carbon fiber, such as the properties of a functional group, and to enhance the adhesion and the composite comprehensive properties. Examples of sizing agents include epoxy resins, phenol resins, polyethylene glycol, polyurethanes, polyesters, emulsifiers, surfactants, and the like. These may be used in combination of two or more kinds thereof. The sizing agent is preferably water-soluble or water-dispersible. An epoxy resin that has excellent wettability against carbon fibers is preferable, and a multi-functional epoxy resin is more preferable. More specifically, those enumerated below as examples of surface treatment agents for an organic fiber may be used.

The amount of the sizing agent to be adhered is preferably 0.01 to 10 wt % with respect to 100 wt % of the total of the sizing agent and the carbon fiber. If the amount of the sizing agent to be adhered is 0.01 wt % or more, the adhesion to the thermoplastic resin (C) can be further enhanced. The amount of the sizing agent to be adhered is more preferably 0.05 wt % or more, still more preferably 0.1 wt % or more. On the other hand, if the amount of the sizing agent to be adhered is 10 wt % or less, the physical properties of the thermoplastic resin (C) can be maintained at higher levels. The amount of the sizing agent to be adhered is more preferably 5 wt % or less, still more preferably 2 wt % or less.

Examples of means for applying a sizing agent include, but are not limited particularly to, a method in which a sizing agent is dissolved (or dispersed) in a solvent (or a dispersion medium if the sizing agent is dispersed) to prepare a sizing treatment liquid, which is then applied to a carbon fiber, and the solvent is then dried/evaporated to be removed. Examples of methods of applying a sizing treatment liquid to a carbon fiber include: a method in which a carbon fiber is immersed in a sizing treatment liquid through a roller; a method in which a carbon fiber is brought into contact with a roller having a sizing treatment liquid adhered thereto; and a method in which a sizing treatment liquid in the form of fine mists is atomized onto a carbon fiber. The means for applying a sizing agent may be in either one of a batch mode and a continuous mode, and is preferably in a continuous mode because this mode affords better productivity and lower unevenness. In this case, it is preferable to adjust the concentration or temperature of the sizing treatment liquid and the tension of the carbon fiber so that the amount of the sizing agent adhered to a carbon fiber can become uniform within a proper range. It is more preferable that the carbon fiber is vibrated with ultrasonic waves during the application of the sizing treatment liquid.

The drying temperature and the drying time should be adjusted in accordance with the amount of the compound to be adhered. The drying temperature is preferably 150° C. or more and 350° C. or less, more preferably 180° C. or more and 250° C. or less, from the viewpoint of completely removing the solvent used in the sizing treatment liquid, reducing the time required for the drying, preventing the thermal degradation of the sizing agent, and preventing the sized carbon fiber from being hardened to have worse spreadability.

Examples of solvents to be used in a sizing treatment liquid include water, methanol, ethanol, dimethylformamide, dimethylacetamide, acetone, and the like. from the viewpoint of easy handling and disaster prevention, water is preferred. Thus, in cases where a compound that is water-insoluble or is poorly soluble in water is used as a sizing agent, it is preferable to add an emulsifier or a surfactant to disperse the compound in water before usage. Specific examples of emulsifiers or surfactants that can be used include: an anionic emulsifier such as a styrene-maleic anhydride copolymer, an olefin-maleic anhydride copolymer, a formaldehyde condensate of a naphthalene sulfonic acid salt, and sodium polyacrylate; a cationic emulsifier such as polyethyleneimine and polyvinylimidazoline; and a non-ionic emulsifier such as a nonylphenol ethylene oxide adduct, polyvinyl alcohol, a polyoxyethylene ether ester copolymer, and a sorbitan ester ethyl oxide adduct. A nonionic emulsifier having a low interaction hardly interferes with the adhesion effect of a functional group contained in the sizing agent, and thus, is preferable.

The carbon fiber (A) content of a molded article according to the present invention is 5 to 45 parts by weight (5 parts by weight or more and 45 parts by weight or less) with respect to 100 parts by weight of the total of the carbon fiber (A), the organic fiber (B), and the thermoplastic resin (C). A carbon fiber (A) content of less than 5 parts by weight decreases the impact strength of the molded article. The carbon fiber (A) content is preferably 10 parts by weight or more, more preferably 20 parts by weight or more. On the other hand, a carbon fiber (A) content of more than 45 parts by weight decreases the dispersibility of fibers and thus increases entanglement between fibers. This results in breaking fibers, thus shortening the fiber length and decreasing the impact strength. The carbon fiber (A) content is preferably 30 parts by weight or less.

<Thermoplastic Resin (C)>

In the present invention, the thermoplastic resin (C) is a matrix resin that constitutes part of a molded article. The thermoplastic resins (C) preferably has a molding temperature (melting temperature) of 200 to 450° C., and examples of such a thermoplastic resin include polyolefin resins, polystyrene resins, polyamide resins, vinyl halide resins, polyacetal resins, saturated polyester resins, polycarbonate resins, polyarylsulfone resins, polyaryl ketone resins, polyarylene ether resins, polyarylene sulfide resins, polyaryl ether ketone resins, polyether sulfone resins, polyarylene sulfide sulfone resins, polyalylate resins, polyamide resins, and the like. These can be used in combination of two or more kinds thereof. A preferable polyolefin resin is a polypropylene resin.

Among these thermoplastic resins (C), at least one selected from the group consisting of polypropylene resins, polyester resins, and polyarylene sulfide resins is more preferable because these resins are light in weight and have an excellent balance between mechanical properties and moldability, and polypropylene resins are still more preferable because of their excellent general-purpose properties. Polypropylene resins may be unmodified or modified.

Specific examples of unmodified polypropylene resins include: homopolymers of propylene; and copolymers of propylene and at least one monomer selected from the group consisting of α-olefins, conjugated dienes, non-conjugated dienes, and other thermoplastic monomers; and the like. Examples of copolymers include random copolymers and block copolymers. Examples of α-olefins include $C_2$-$C_{12}$ α-olefins excluding propylene, such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, 1-dodecene, and the like. Examples of conjugated dienes and non-conjugated dienes include butadiene, ethylidene norbornene, dicyclopentadiene, 1,5-hexadiene, and the like. These may be used in combination of two or more kinds thereof. Suitable examples include polypropylene, ethylene/ propylene copolymers, propylene/1-butene copolymers, ethylene/propylene/1-butene copolymers, and the like. Propylene homopolymers are preferable from the viewpoint of enhancing the stiffness of a molded article. Random or block copolymers of propylene and at least one monomer selected from the group consisting of α-olefins, conjugated dienes, and non-conjugated dienes are preferable from the viewpoint of enhancing the impact strength of a molded article.

In addition, the modified polypropylene is preferably an acid-modified polypropylene resin, more preferably an acid-modified polypropylene resin having a carboxylic acid and/or a carboxylate group bound to the polymer chain. The above-mentioned acid-modified polypropylene resins can be obtained by various methods. For example, the acid-modified polypropylene resin can be obtained by allowing an unmodified polypropylene resin to be graft-polymerized with a monomer having a neutralized or unneutralized carboxylic group and/or a monomer having a saponified or unsaponified carboxylic ester group.

Here, examples of monomers having a neutralized or unneutralized carboxylic group and monomers having a saponified or unsaponified carboxylic ester group include ethylenic unsaturated carboxylic acids, anhydrides thereof, ethylenic unsaturated carboxylic esters, and the like.

Examples of ethylenic unsaturated carboxylic acids include (meth)acrylic acids, maleic acids, fumaric acids, tetrahydrophthalic acids, itaconic acids, citraconic acids, crotonic acids, isocrotonic acids and the like. Examples of anhydrides thereof include nadic acid TM (endocis-bicyclo[2,2,1]hepto-5-ene-2,3-dicarboxylic acid), maleic anhydrides, citraconic anhydrides, and the like.

Examples of ethylenic unsaturated carboxylic esters include: (meth)acrylic esters such as methyl (meth)acrylate, ethyl (meth)acrylate, propyl (meth)acrylate, n-butyl (meth)acrylate, iso-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethylaminoethyl (meth)acrylate, and diethylaminoethyl (meth)acrylate; hydroxyl group-containing (meth)acrylic esters such as hydroxyethyl acrylate, 2-hydroxyethyl (meth)acrylate, 2-hydroxypropyl (meth)acrylate, 4-hydroxybutyl acrylate, lactone modified hydroxyethyl (meth)acrylate, and 2-hydroxy-3-phenoxypropyl acrylate; epoxy group-containing (meth)acrylic acid esters such as glycidyl (meth)acrylate and methylglycidyl (meth)acrylate; aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate, and N,N-dihydroxyethylaminoethyl (meth)acrylate; and the like.

These can be used in combination of two or more kinds thereof. Among these, ethylenic unsaturated carboxylic anhydrides are preferable, and maleic anhydrides are more preferable.

Examples of polyester resins include polyethylene terephthalate, polybutylene terephthalate, polyethylene naphthalate, and copolymers thereof.

Examples of polyarylene sulfide resins include polyphenylene sulfide (PPS) resins, polyphenylene sulfide sulfone resins, polyphenylene sulfide ketone resins, random or block copolymers thereof, and the like. These may be used in combination of two or more kinds thereof. Among these, polyphenylene sulfide resins are particularly preferably used.

A polyarylene sulfide resin can be produced by any method, for example, a method of obtaining a polymer having a relatively small molecular weight described in JP45-3368B, a method of obtaining a polymer having a relatively large molecular weight described in JP52-12240B and JP61-7332A, and the like.

The obtained polyarylene sulfide resin may be allowed to undergo various treatments such as: cross-linking the resin and imparting a higher molecular weight to the resin by heating in air; heat-treating the resin under an atmosphere of inert gas such as nitrogen or under reduced pressure; washing the resin with an organic solvent, hot-water, or an acid aqueous solution; activating the resin with a functional group-containing compound such as an acid anhydride, amine, isocyanate, and a functional group-containing disulfide compound.

Examples of methods of heating a polyarylene sulfide resin to cross-link the resin and impart a higher molecular weight to the resin include a method in which a polyarylene sulfide resin is heated until the resin obtains a desired melt viscosity in a heated container at a predetermined temperature under an oxidizing gas atmosphere such as air or oxygen or under an atmosphere of a gas mixture of the oxidizing gas and an inert gas such as nitrogen or argon. The heat-treatment temperature is preferably in a range of from 200 to 270° C., and the heat-treatment time is preferably in a range of from 2 to 50 hours. Adjusting the treatment temperature and the treatment time makes it possible to adjust the viscosity of the obtained polymer in a desired range. Examples of heat-treatment devices include common hot air dryers, rotary heating devices, heating devices with agitating blades, and the like. Rotary heating devices or heating devices with agitating blades are preferably used from the viewpoint of efficient and more uniform heat-treatment.

If a polyarylene sulfide resin is treated under reduced pressure, the pressure is preferably 7,000 $Nm^{-2}$ or less. Examples of heat-treatment devices include common hot air dryers, rotary heating devices, heating devices with agitating blades, and the like. Rotary heating devices or heating devices with agitating blades are preferably used from the viewpoint of efficient and more uniform heat-treatment.

In cases where a polyarylene sulfide resin is washed with an organic solvent, examples of organic solvents include: nitrogen-containing polar solvents such as N-methylpyrrolidone, dimethylformamide, and dimethylacetamide; sulfoxide-based and sulfone-based solvents such as dimethylsulfoxide and dimethylsulfone; ketone-based solvents such as acetone, methylethylketone, diethylketone, and acetophenone; ether-based solvents such as dimethylether, dipropylether, and tetrahydrofuran; halogen-based solvents such as chloroform, methylene chloride, trichloroethylene, ethylene dichloride, dichloroethane, tetrachloroethane, and chlorobenzene; alcohol-based or phenol-based solvents such as methanol, ethanol, propanol, butanol, pentanol, ethylene glycol, propylene glycol, phenol, cresol, and polyethylene glycol; and aromatic hydrocarbon-based solvents such as benzene, toluene, and xylene. These may be used in combination of two or more kinds thereof. Among these organic solvents, N-methylpyrrolidone, acetone, dimethylformamide, chloroform, and the like are preferably used. Examples of methods of washing with an organic solvent include a method in which a polyarylene sulfide resin is immersed in an organic solvent. If necessary, the resin can be suitably stirred or heated. A washing temperature at which a polyarylene sulfide resin is washed in an organic solvent is preferably normal temperature to 150° C. In this regard, the polyarylene sulfide resin that has been washed with an organic solvent is preferably washed with water or hot water several times so that the residual organic solvent can be removed.

In cases where a polyarylene sulfide resin is washed with hot-water, water to be used is preferably distilled water or deionized water to express the effect of the favorable chemical modification to be achieved by the polyarylene sulfide resin washed with hot-water. Hot-water washing is usually carried out by adding a predetermined amount of polyarylene sulfide resin to a predetermined amount of water and heating the resulting mixture with stirring at normal pressure or in a pressure container. A ratio of a polyarylene sulfide resin to water is selected preferably from bath ratios of 200 g or less of polyarylene sulfide resin to 1 liter of water.

Examples of methods of acid-treating a polyarylene sulfide resin include a method in which a polyarylene sulfide resin is immersed in an acid or an acid aqueous solution. If necessary, the resin can be suitably stirred or heated. Examples of acids include: aliphatic saturated monocarboxylic acids such as formic acid, acetic acid, propionic acid, and butyric acid; halo-substituted aliphatic saturated carboxylic acids such as chloroacetic acid and dichloroacetic acid; aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid, and fumaric acid; and inorganic acidic compounds such as sulfuric acid, phosphoric acid, hydrochloric acid, carbonic acid, and silic acid. Among these acids, acetic acid or hydrochloric acid is preferably used. The polyarylene sulfide resin that has been acid-treated is preferably washed with water or hot water several times so that the residual acid or salt can be removed. Water to be used for washing is preferably distilled water or deionized water.

The polyarylene sulfide resin preferably has a melt viscosity of 80 Pa s or less, more preferably 20 Pa s or less, under the conditions: 310° C. and a shear speed of 1000/second. The melt viscosity is not limited to any particular lower limit, but is preferably 5 Pa s or more. Two or more polyarylene sulfide resins having different melt viscosities may be used in combination. The melt viscosity can be measured using a Capilograph device (manufactured by Toyo Seiki Co. Ltd.) under the conditions: a die length of 10 mm and a die hole diameter of 0.5 to 1.0 mm.

Examples of polyarylene sulfide resins that can be used include commercially available products such as ones marketed under the tradenames of "TORELINA" (registered trademark) manufactured by Toray Industries, Inc., "DIC. PPS" (registered trademark) manufactured by DIC Corporation, and "DURAFIDE" (registered trademark) manufactured by Polyplastics Co., Ltd.

The thermoplastic resin (C) content of a molded article according to the present invention is 20 to 94 parts by weight (20 parts by weight or more and 94 parts by weight or less) with respect to 100 parts by weight of the total of the carbon fiber (A), the organic fiber (B), and the thermoplastic resin (C). A thermoplastic resin (C) content of less than 20 parts by weight decreases the fiber dispersibility of the carbon fiber (A) and the organic fiber (B) in a molded article and decreases the impact strength. The thermoplastic resin (C) content is preferably 30 parts by weight or more. On the other hand, a thermoplastic resin (C) content of more than 94 parts by weight results in making the carbon fiber (A) content and the organic fiber (B) content relative smaller, thus decreasing the reinforcement effect of the fibers and decreasing the impact strength. The thermoplastic resin (C) content is preferably 85 parts by weight or less, more preferably 75 parts by weight or less.

<Organic Fiber (B)>

A molded article according to the present invention contains an organic fiber (B) in addition to the above-mentioned carbon fiber (A). A carbon fiber such as the carbon fiber (A) is rigid and brittle, and thus, less easily entangled and more easily broken. Because of this, there is a problem in that a fiber bundle composed of only carbon fibers is easily broken in production of molded articles, and easily falls off from a molded article. In view of this, the organic fiber (B), which is flexible and less easily broken, is contained in a molded article, and thus can significantly enhance the impact strength of the molded article.

The organic fiber (B) can suitably be selected to the extent that the organic fiber (B) does not decrease the mechanical properties of a molded article very much. Examples thereof include fibers obtained by spinning the following: a polyolefin-based resin such as polyethylene or polypropylene; a polyamide-based resin such as nylon 6, nylon 66, aromatic polyamide, or aramid; a polyester-based resin such as polyethylene terephthalate or polybutylene terephthalate; a fluorine resin such as polytetrafluoroethylene, a perfluoroethylene/propene copolymer, or an ethylene/tetrafluoroethylene copolymer; a liquid crystal polymer such as a liquid crystal polyester or liquid crystal polyester amide; and a resin such as polyether ketone, polyether sulfone, poly(paraphenylenebenzoxazole), a polyarylene sulfide such as polyphenylene sulfide, and polyacrylonitrile. These may be used in combination of two or more kinds thereof.

In the present invention, an organic fiber having a strand strength of 1500 MPa or more is used. Use of an organic fiber having a strand strength of less than 1500 MPa is more likely to cause the organic fiber to be fractured in an impact test and is less easily pulled out, and thus, the obtained molded article results in having insufficient impact resistance.

The strand strength is more preferably 3000 MPa or more, still more preferably 5000 MPa or more. The strand strength is preferably less than 7000 MPa. A strand strength of more than 7000 MPa substantially does not cause fiber fracture even if the molded article undergoes an impact, and thus, the molded article does not result in achieving enhanced impact strength.

Among the above-mentioned organic fibers, examples of organic fibers having a strand strength of 1500 MPa or more include "fibers obtained by spinning the following: a polyamide-based resin such as aromatic polyamide or aramid; a fluorine resin such as polytetrafluoroethylene, a perfluoroethylene/propene copolymer, or an ethylene/tetrafluoroethylene copolymer; a liquid crystal polymer such as a liquid crystal polyester or liquid crystal polyester amide; and a resin such as polyether ketone, polyether sulfone, or poly(paraphenylenebenzoxazole)".

The organic fiber (B) preferably has a single fiber fineness of 0.1 to 10 dtex.

In the present invention, the organic fiber (B) content of a molded article is 1 to 45 parts by weight with respect to 100 parts by weight of the total of the carbon fiber (A), the organic fiber (B), and the thermoplastic resin (C). An organic fiber (B) content of less than 1 part by weight decreases the impact strength of the molded article. The organic fiber (B) content is preferably 3 parts by weight or more, more preferably 5 parts by weight or more. On the other hand, an organic fiber (B) content of more than 45 parts by weight increases entanglement between fibers, decreases the dispersibility of the organic fiber (B) in a molded article, and more often decreases the impact strength of the molded article. The organic fiber (B) content is preferably 20 parts by weight or less, more preferably 10 parts by weight or less.

<Other Components>

A molded article according to the present invention may contain (an)other component(s) in addition to the components (A) to (C) to the extent that the objects of the present invention are not impaired. Examples of the (an)other components include thermosetting resins, inorganic fillers other than carbon fibers, flame retardants, nucleating agents, ultraviolet absorbers, antioxidants, vibration damping agents, antimicrobial agents, insect repellents, deodorizers, color protection agents, heat stabilizers, mold release agents, antistatic agents, plasticizers, lubricant, coloring agents, pigments, dyes, foaming agents, antifoaming agents, coupling agents, and the like. In addition, the molded article may contain, for example, the below-mentioned component (D) used for molding materials.

<$L_{co}/l_{no}$ of Molded Article According to Present Invention>

In a molded article according to the present invention, a ratio ($L_{co}/l_{no}$) of the critical fiber length $L_{co}$ of the organic fiber (B) to the number average fiber length $l_{no}$ of the organic fiber (B) in the fiber reinforced thermoplastic resin molded article is 0.9 or more and 2.0 or less. The ratio in this range causes organic fiber pull-out to occur more preferentially than organic fiber fracture and thus, makes it possible to obtain a molded article which allows impact energy absorption to be increased through the fiber pull-out, even when the molded article undergoes an impact, and which thus achieves high flexural strength and impact strength. A ratio ($L_{co}/l_{no}$) of less than 0.9 causes the organic fiber fracture to occur more preferentially, causes the pull-out less easily, and thus, decreases the impact strength. The ratio is more preferably 1.0 or more, still more preferably 1.1 or more. $L_{co}$ is small, and thus, a ratio ($L_{co}/l_{no}$) of more than 2.0 causes the adhesion between the organic fiber (B) and the thermoplastic resin (C) to be insufficient, decreasing the flexural strength of the molded article. Alternatively, the fiber length $l_{no}$ of the organic fiber becomes smaller, decreasing the impact strength. The ratio is more preferably 1.4 or less, still more preferably 1.2 or less.

Examples of means for adjusting $L_{co}/l_{no}$ in the above-mentioned range include a means by which $L_{co}$ and $l_{no}$ are adjusted as above-mentioned. A detailed description follows below.

Critical Fiber Length $L_c$

Here, a critical fiber length refers to the smallest fiber length that allows fracture to occur at the interface between fiber and matrix resin, and in theory, fiber fracture does not occur with a fiber length smaller than the critical fiber length. Hereinafter, $L_{cc}$ is the critical fiber length of the carbon fiber (A), and $L_{co}$ is the critical fiber length of the organic fiber (B).

The carbon fiber (A) preferably has a critical fiber length $L_{cc}$ of 2500 μm or less. The critical fiber length of 2500 μm or less allows the carbon fiber (A) and the thermoplastic resin (C) to have sufficient adhesion therebetween, enhancing the flexural strength of a molded article, and thus, is preferable. The critical fiber length is more preferably 1500 μm or less. The carbon fiber (A) having a critical fiber length $L_{cc}$ of 500 μm or more enhances the impact strength of the molded article, and thus, is preferable.

The organic fiber (B) preferably has a critical fiber length Lm of 3000 μm or more. The critical fiber length of 3000 μm or more is more likely to cause fiber pull-out than fiber fracture in an impact test, enhancing the impact strength of the molded article, and thus, is preferable. The organic fiber (B) more preferably has a critical fiber length $L_{co}$ of 5000 μm or more, still more preferably 7000 μm or more. The organic fiber (B) having a critical fiber length $L_{co}$ of 15000 μm or less enhances the flexural strength of the molded article, and thus, is preferable.

In the present invention, a ratio ($L_{cc}/L_{co}$) of the critical fiber length $L_{cc}$ of the carbon fiber (A) to the critical fiber length $L_{co}$ of the organic fiber (B) is preferably 0.1 or more and 0.4 or less. A ratio ($L_{cc}/L_{co}$) of 0.1 or more enhances the flexural strength of the molded article, and thus, is preferable. The ratio is more preferably 0.3 or more. A ratio ($L_{cc}/L_{co}$) of 0.4 or less enhances the impact strength, and thus, is preferable. As below-mentioned, the critical fiber length varies with the shear strength (τ) at the interface between fiber and matrix resin, and thus, to determine the ratio $L_{cc}/L_{co}$, the carbon fiber and the organic fiber are measured for interfacial shear strength preferably using the same matrix resin.

Next, a method of calculating a critical fiber length Lc will be described. If a shearing stress at the interface is constant along a fiber length, the critical fiber length $L_c$ is represented by the following equation.

$$L_c = (\sigma f \times df)/2\tau$$

Here, τ, σf, and, df represent an interfacial shear strength, a single fiber strength, and a fiber diameter respectively at the interface between fiber and matrix resin. These will be described below in detail.

τ: Shear Strength at the Interface Between Fiber and Matrix Resin

An interfacial shear strength τ represents an interfacial shear strength at the interface between fiber surface and matrix resin, and can be measured by the following method. It should be noted that an interfacial shear strength obtained using a fiber coated with a surface treatment agent refers to a shear strength at the interface between the surface of a fiber containing the surface treatment agent and a matrix resin.

First, a thermoplastic resin is heated on a heater, and a single fiber is brought down into the resin from above and embedded in the resin in such a manner that the fiber forms a straight line. Here, the depth at which the fiber is embedded in the direction of the straight line is defined as H. The resin having the single fiber embedded therein is cooled to normal temperature, and then, that end of the fiber which is not embedded in the resin is fixed on a pull-out tester. The end is pulled at a speed of 0.1 to 100 m/second in the straight line direction of the fiber and in the direction allowing the fiber to be pulled out. Thus, the maximum load value F is determined.

Using the following equation, F is divided by an embedded depth H and a fiber perimeter (π·df), so that an interfacial shear strength τ can be determined.

$$\tau = F/(\pi \cdot df \cdot H)$$

Here, π represents the circumference ratio, and a fiber diameter df (hereinafter, may be referred to as a single fiber diameter) can be calculated using the average of three or more fiber diameters randomly selected from the fibers observed using an optical microscope (at 200 to 1000×), wherein the fibers are yet to be subjected to pull-out measurement.

For a molded article composed of two or more fibers, the following equation can be used for calculation after the values Lc and τ of each of the fiber components are determined.

$$L_c = L_{c1} \cdot w_1 + L_{c2} \cdot w_2 + L_{c3} \cdot w_3 \ldots$$

$$\tau = \tau_1 \cdot w_1 + \tau_2 \cdot w_2 + \tau_3 \cdot w_3 \ldots$$

Here, $L_{c1}$, $L_{c2}$, and $L_{c3}$ ... are the $L_c$ of a first component, the Lc of a second component, and the $L_c$ of a third component respectively, and $w_1$, $w_2$, and $w_3$ ... are the fiber weight ratio of the first component, the fiber weight ratio of the second component, and the fiber weight ratio of the third component respectively, assuming that the weight of the entire fiber in a molded article is 1.

σf: Single Fiber Strength of Fiber

The single fiber strength is a strength per unit cross-sectional area of the single fiber, and is a value obtained by dividing the single fiber tenacity by the cross-sectional area of the fiber. In this regard, a strand strength is a value obtained by dividing the tenacity of a strand by the cross-sectional area of the fiber contained in the strand, and thus, in the present invention, the strand strength can be used as a single fiber strength σf in the above-mentioned equation.

The strand strength can be determined in accordance with the resin-impregnated strand testing method described in JIS-R-7608 (2004). In formulation of a resin, CELLOXIDE (registered trademark) 2021P (manufactured by Daicel Corporation), boron trifluoride monoethyl amine (manufactured by Tokyo Chemical Industry Co., Ltd.), and acetone are used at a ratio of 100:3:4 (parts by weight), and the curing conditions: 130° C. and 30 minutes are used. In this regard, the fiber cross-sectional area can be calculated using the below-mentioned df (fiber diameter).

df: Fiber Diameter

As above-mentioned, the fiber diameter df can be calculated using the average of three or more fiber diameters randomly selected from the fibers observed using an optical microscope (at 200 to 1000×).

Method of Adjusting $L_c$

As above-mentioned, the critical fiber length ($L_c$) can be determined using (σf×df)/2τ, and thus, adjusting the interfacial shear strength (τ), the single fiber fiber strength (σf), and the fiber diameter (df) makes it possible to adjust the critical fiber length ($L_c$). These will be described below.

Interfacial Shear Strength

In the present invention, the organic fiber (B) has an interfacial shear strength of 3.0 MPa or more and 50 MPa or less. An interfacial shear strength of less than 3.0 MPa decreases adhesion between the matrix resin and the organic fiber (B), and thus, decreases the flexural strength of the molded article. The interfacial shear strength is more preferably 3.3 MPa or more, still more preferably 4.0 MPa or more. The interfacial shear strength is still more preferably 5.0 MPa or more. An interfacial shear strength of more than 50 MPa decreases $L_{co}$, and thus, lowers the impact strength of the molded article. The interfacial shear strength is preferably 30 MPa or less, more preferably 10 MPa or less, still more preferably 6 MPa or less.

The interfacial shear strength at the interface between fiber and matrix resin can be measured by the above-mentioned method. Examples of methods of adjusting an interfacial shear strength include adjusting the amount and kind of a surface treatment agent to be adhered to the surface of a fiber.

A surface treatment agent (what is called a sizing agent) that can be used for the carbon fiber is as above-mentioned.

Examples of surface treatment agents for the organic fiber are below-mentioned. In this regard, those enumerated below as examples of surface treatment agents for the organic fiber can be used as surface treatment agents for the carbon fiber, and surface treatment agents used for the carbon fiber and surface treatment agents used for the organic fiber may be the same or different.

For example, a modifier such as an epoxy resin, phenol resin, polyethylene glycol, or polyurethane is used as a surface treatment agent for the organic fiber so that the interfacial shear strength can be enhanced and so that the flexural strength can be enhanced. Among these, an epoxy resin that has excellent wettability against the organic fiber (B) is preferable, and a multi-functional epoxy resin is more preferable.

Examples of multi-functional epoxy resins include bisphenol A epoxy resins, bisphenol F epoxy resins, aliphatic epoxy resins, phenol novolac epoxy resins, and the like. Among these, aliphatic epoxy resins that are more likely to exhibit adhesion to the thermoplastic resin (C) are preferable. Aliphatic epoxy resins have a flexible backbone and thus are more likely to have a structure having high toughness although having a high cross-linking density. In addition, an aliphatic epoxy resin that may be allowed to be present between the fiber and the thermoplastic resin is flexible and makes it difficult for both to peel apart, and thus, can further enhance the strength of the molded article.

Examples of multi-functional aliphatic epoxy resins include diglycidyl ether compounds, polyglycidyl ether compounds, and the like. Examples of diglycidyl ether compounds include ethylene glycol diglycidyl ethers, polyethylene glycol diglycidyl ethers, propylene glycol diglycidyl ethers, polypropylene glycol diglycidyl ethers, 1,4-butanediol diglycidyl ethers, neopentyl glycol diglycidyl ethers, polytetramethylene glycol diglycidyl ethers, polyalkylene glycol diglycidyl ethers, and the like. In addition, examples of polyglycidyl ether compounds include glycerol polyglycidyl ethers, diglycerol polyglycidyl ethers, polyglycerol polyglycidyl ethers, sorbitol polyglycidyl ethers, arabitol polyglycidyl ethers, trimethylolpropane polyglycidyl ethers, trimethylolpropane glycidyl ethers, pentaerythritol polyglycidyl ethers, polyglycidyl ethers of aliphatic multivalent alcohols, and the like.

Among the above-mentioned aliphatic epoxy resins, ti-functional or more-multi-functional aliphatic epoxy resins are preferable, and aliphatic polyglycidyl ether compounds having three or more glycidyl groups having high reactivity are more preferable. Aliphatic polyglycidyl ether compounds exhibit a good balance among flexibility, cross-linking density, and compatibility with the thermoplastic resin (C), and can enhance the adhesion. Among these, glycerol polyglycidyl ethers, diglycerol polyglycidyl ethers, polyglycerol polyglycidyl ethers, polyethylene glycol glycidyl ethers, and polypropylene glycol glycidyl ethers are still more preferable.

Use of a modifier such as a silicon oil solution makes it possible to increase $L_c$ and enhance the impact strength of the molded article.

In addition, a polyester, an emulsifier, or a surfactant may be used, and two or more of these may be used. The surface treatment agent is preferably water-soluble or water-dispersible.

The amount of the above-mentioned surface treatment agent to be adhered is preferably 0.1 parts by weight or more, 5.0 parts by weight or less, with respect to 100 parts by weight of the organic fiber. An amount of 0.1 parts by weight or more enhances the dispersibility of the organic fiber in a molded article, and thus, enhances the impact strength and flexural strength. The amount is preferably 0.3 parts by weight or more, more preferably 0.5 parts by weight or more. Such a surface treatment agent inhibits the dispersion of the organic fiber if excessively adhered to the organic fiber, and thus, an amount of 5.0 parts by weight or less enhances the dispersibility of the organic fiber in a molded article, and thus, enhances the flexural strength. The amount is preferably 3.0 parts by weight or less, more preferably 1.5 parts by weight or less.

In this regard, the carbon fiber (A) preferably has an interfacial shear strength of 5 MPa or more. An interfacial shear strength of 5 MPa or more allows the carbon fiber (A) and the thermoplastic resin (C) to have high adhesion therebetween, enhancing the flexural strength of the molded article. The interfacial shear strength is more preferably 6 MPa or more, still more preferably 10 MPa or more. The carbon fiber (A) having an interfacial shear strength of 50 MPa or less enhances the impact strength of the molded article, and thus, is preferable. The interfacial shear strength is more preferably 30 MPa or less.

The method of measuring the interfacial shear strength of the organic fiber (B) can be used as a method of measuring the interfacial shear strength of the carbon fiber (A). Examples of methods of adjusting the interfacial shear strength of the carbon fiber (A) include adjusting the amount and kind of a sizing agent.

In addition, the interfacial shear strength is an index of adhesive strength at the interface between fiber and matrix resin, and thus, can be adjusted according to the degree of modification of the matrix resin and the selection of an organic fiber in accordance with the degree of modification.

For a less adhesive fiber such as an aramid fiber or a poly(paraphenylenebenzoxazole) fiber, a more adhesive resin such as a polyolefin resin, a polyamide resin, a polyester resin, or a polycarbonate resin is preferable from the viewpoint of enhancing the impact strength and flexural strength and used to enhance the flexural strength of the molded article. Among these, a polypropylene resin and/or a polyester resin are preferable. Among polyolefin resins, particularly a polypropylene resin used as a matrix resin may be an unmodified polypropylene or a modified polypropylene, and an unmodified polypropylene and a modified polypropylene resin are preferably used in combination to enhance the interfacial shear strength. In particular, with a less adhesive fiber such as an aramid fiber or a poly (paraphenylenebenzoxazole) fiber, an unmodified polypropylene resin and a modified polypropylene resin are preferably used at a weight ratio of 99:1 to 90:10 to enhance the interfacial shear strength. The weight ratio is more preferably 97:3 to 95:5, still more preferably 97:3 to 96:4.

For a more adhesive fiber such as a liquid crystal polyester (LCP) fiber, a less adhesive resin such as a polyolefin resin, polystyrene resin, polyarylsulfone resin, polyaryl ketone resin, polyarylene ether resin, polyarylene sulfide resin, polyaryl ether ketone resin, polyether sulfone resin, or polyarylene sulfide sulfone resin is preferable from the viewpoint of enhancing the impact strength and flexural strength. Among these, a polyolefin resin and/or a polyarylene sulfide resin are preferable. Among polyolefin resins, particularly a polypropylene resin used as a matrix resin may be an unmodified polypropylene or a modified polypropylene, and an unmodified polypropylene and a modified polypropylene resin are preferably used in combination to enhance the interfacial shear strength. More specifically, an unmodified polypropylene resin and a modified polypropylene resin are preferably used at a weight ratio of 100:0 to 97:3. The weight ratio is more preferably 100:0 to 99:1 from the viewpoint of a balance between impact strength and flexural strength.

Single Fiber Strength, Fiber Diameter, and Single Fiber Tenacity

The single fiber strength is a strength per unit cross-sectional area of the single fiber, is a value obtained by dividing the single fiber tenacity by the cross-sectional area of the fiber, and depends on the fiber type.

In the present invention, the organic fiber (B) has a single fiber tenacity of 50 cN or more. The organic fiber (B) having a single fiber tenacity of less than 50 cN causes the ratio ($L_{co}/l_{no}$) to be smaller, is less likely to cause fiber pull-out than fiber fracture in an impact test, and less likely to enhance the impact strength. The single fiber tenacity is more preferably 70 cN or more, still more preferably 120 cN or more. Although there is no particular upper limit, the single fiber tenacity is preferably 250 cN or less.

A fiber that satisfies a single fiber tenacity of 50 cN or more is preferably at least one selected from the group consisting of liquid crystalline polyester fibers, aramid fibers, and poly(paraphenylenebenzoxazole) fibers.

In the present invention, a liquid crystal polyester fiber mentioned as an example of an organic fiber having a strand strength of 1500 MPa or more preferably has a fiber diameter of 6 μm or more and 1000 μm or less. The fiber diameter of 6 μm or more increases the critical fiber length $L_{co}$, enhances the impact strength, and thus, is preferable. The fiber diameter is more preferably 10 μm or more. The fiber diameter of 1000 μm or less enhances the flowability during molding, makes the moldability better, and thus, is preferable.

About $l_n$

Here, the "number average fiber length ($l_n$)" in the present invention refers to an average fiber length calculated using the following equation, wherein a method of calculating a number average molecular weight is applied to the calculation of a fiber length. However, the following equation applies in a case where the fiber diameters and densities of the carbon fiber (A) and the organic fiber (B) are constant.

$$\text{Number average fiber length} = \Sigma(Mi)/(N)$$

Mi: fiber length (mm)
N: number of fibers

The number average fiber length can be measured by the following method. An ISO type of dumbbell specimen is sandwiched between glass plates, heated on a hot stage set to 200 to 300° C., and uniformly dispersed in film form. The film having the fiber uniformly dispersed therein is observed using an optical microscope (at 50 to 200×). Randomly selected 1000 carbon fibers (A) and organic fibers (B) are measured for fiber length to calculate the number average fiber length of the carbon fibers (A) and the number average fiber length of the organic fibers (B) using the above-mentioned equation.

In the present invention, the carbon fiber (A) preferably has a number average fiber length $l_n$, of 100 m or more. The number average fiber length of 100 μm or more enhances the elastic modulus of the molded article, enhances the flexural strength, and thus, is preferable. The number average fiber length is more preferably 200 μm or more, still more preferably 500 μm or more. Although having no particular lower limit, the number average fiber length at 50 μm or less has the possibility of saturating the flexural strength.

In the present invention, the organic fiber (B) preferably has a number average fiber length $l_{no}$ of 2000 μm or more and 15000 μm or less. A number average fiber length of 2000

μm or more enhances the ratio ($L_{co}/l_{no}$), enhances the impact strength, and thus, is preferable. The number average fiber length is more preferably 3000 μm or more, still more preferably 5000 μm or more, yet more preferably 6000 μm or more. The number average fiber length of 15000 μm or less enhances the flowability during molding, makes the moldability better, additionally enhances the impact strength, and thus, is preferable.

In this regard, the number average fiber lengths of the carbon fiber (A) and organic fiber (B) in a molded article can be adjusted, for example, with molding conditions, the length of a molding material, and the like. In injection molding, examples of such molding conditions include pressure conditions such as back pressure and dwelling pressure, time conditions such as injection time and dwell time, temperature conditions such as cylinder temperature and mold temperature, and the like. Specifically, increasing the pressure conditions such as back pressure makes it possible to increase a shear force in the cylinder, and thus, to shorten the number average fiber lengths of the carbon fiber (A) and organic fiber (B). In addition, shortening the injection time makes it possible to increase a shear force during injection, and thus, to shorten the number average fiber lengths of the carbon fiber (A) and organic fiber (B). Furthermore, decreasing the temperature such as cylinder temperature and mold temperature makes it possible to increase the viscosity of a flowing resin, enhance the shear force, and thus, to shorten the number average fiber lengths of the carbon fiber (A) and organic fiber (B). Specific examples of preferable injection molding conditions include, but are not limited particularly to: an injection time of 0.5 seconds to 10 seconds, more preferably 2 seconds to 10 seconds; aback pressure of 0.1 MPa to 10 MPa, more preferably 2 MPa to 8 MPa; a dwelling pressure of 1 MPa to 50 MPa, more preferably 1 MPa to 30 MPa; a dwell time of 1 second to 20 seconds, more preferably 5 seconds to 20 seconds; a cylinder temperature of 200° C. to 320° C.; and a mold temperature of 20° C. to 100° C. Here, cylinder temperature refers to the temperature of that portion of an injection molding machine which melts a molding material by heating, and mold temperature refers to the temperature of a mold into which a resin is injected to be formed in predetermined form. Suitably selecting these conditions, particularly injection time, back pressure, and mold temperature, makes it possible to easily adjust the fiber lengths of the carbon fiber and organic fiber in a molded article.

In cases where a long molding material is used to obtain a molded article, the carbon fiber and organic fiber remaining in the molded article have a long fiber length with the result that the carbon fiber (A) and organic fiber (B) in the molded article have a long number average fiber length.

The molding material preferably has a length of 3 mm or more and 30 mm or less. The length of 3 mm or more causes the carbon fiber (A) and organic fiber (B) remaining in the molded article to have a long fiber length, enhances the impact strength, and thus, is preferable. The length is more preferably 7 mm or more. The length of 30 mm or less causes the carbon fiber (A) and organic fiber (B) to have a good dispersibility during molding, enhances the impact strength, and thus, is preferable.

In the present invention, changing the conditions suitably as above-mentioned enables the carbon fiber (A) and organic fiber (B) in a molded article to have a number average fiber length in a desired range.

To obtain a molded article in the present invention, for example, the following molding material can be used.

In this regard, a "molding material" in the present invention means a raw material used in forming a molded article by injection molding and the like.

A molding material in the present invention may contain a component (D) in addition to the carbon fiber (A), the organic fiber (B), and thermoplastic resin (C) to impart good fiber dispersion in a molded article. For the carbon fiber (A), the organic fiber (B), and thermoplastic resin (C) in the molding material, the above-mentioned materials can be used.

The component (D) often has a low molecular weight, and is often a solid or a liquid that is usually relatively brittle and more breakable at normal temperature. The component (D) has a low molecular weight, thus has high flowability, and enables the carbon fiber (A) and the organic fiber (B) to enhance the effect of dispersing into the thermoplastic resin (C). Examples of the component (D) include epoxy resins, phenol resins, terpene resins, cyclic polyarylene sulfide resins, and the like. The component (D) may contain two or more kinds of these. The component (D) preferably has a high affinity for the thermoplastic resin (C). Selecting a component (D) having a high affinity for the thermoplastic resin (C) allows the component (D) to be efficiently compatible with the thermoplastic resin (C) during production of a molding material and during molding, and thus, makes it possible to further enhance the dispersibility of the carbon fiber (A) and the organic fiber (B).

The component (D) is selected suitably according to combination with the thermoplastic resin (C). For example, a molding temperature range of from 150° C. to 270° C. allows a terpene resin to be used suitably. A molding temperature range of from 270° C. to 320° C. allows an epoxy resin, a phenol resin, and a cyclic polyarylene sulfide resin to be used suitably. Specifically, in cases where the thermoplastic resin (C) is a polypropylene resin, the component (D) is preferably a terpene resin. In cases where the thermoplastic resin (C) is a polycarbonate resin or a polyarylene sulfide resin, the component (D) is preferably an epoxy resin, a phenol resin, or a cyclic polyarylene sulfide resin. In cases where the thermoplastic resin (C) is a polyamide resin or a polyester resin, the component (D) is preferably a terpene phenol resin.

The component (D) preferably has a melt viscosity of 0.01 to 10 Pa s at 200° C. The melt viscosity of 0.01 Pa s or more at 200° C. makes it possible to prevent the component (D) from agglomerating in the carbon fiber (A) and the organic fiber (B) impregnated with the component (D), and to adhere the component (D) to the fibers uniformly. Accordingly, this melt viscosity makes it possible to further enhance the dispersibility of the carbon fiber (A) and the organic fiber (B) in molding a molding material according to the present invention. The melt viscosity is more preferably 0.05 Pa s or more, still more preferably 0.1 Pa s or more. On the other hand, the melt viscosity of 10 Pa s or less at 200° C. causes the component (D) to have a higher impregnation speed, and thus, the melt viscosity is preferably 5 Pa s or less, more preferably 2 Pa s or less, so that the component (D) can be adhered uniformly to the carbon fiber (A) and the organic fiber (B). Here, the melt viscosity of each of thermoplastic resin (C) and the component (D) at 200° C. can be measured using a viscoelasticity measurement device with a 40 mm parallel plate at 0.5 Hz.

In production of a molding material according to the present invention, it is preferable to adhere the component (D) to the carbon fiber (A) and the organic fiber (B) to first obtain a composite fiber bundle (E) as below-mentioned, and a melting temperature (a temperature in a melting bath)

in supplying the component (D) is preferably 100 to 300° C. In view of this, the melt viscosity of the component (D) at 200° C. has been noticed as an index for the impregnating property of the component (D) in the carbon fiber (A) and the organic fiber (B). A 200° C. melt viscosity in the above-mentioned preferable range allows the component (D) to have an excellent impregnating property in the carbon fiber (A) and the organic fiber (B) in such a preferable melting temperature range, and thus, makes it possible to enhance the dispersibility of the carbon fiber (A) and organic fiber (B) in a molded article and to enhance the mechanical properties, particularly impact strength, of the molded article.

The component (D) preferably has a number average molecular weight of 200 to 50,000. The number average molecular weight of 200 or more makes it possible to enhance the mechanical properties, particularly impact strength, of the molded article. The number average molecular weight is more preferably 1,000 or more. In addition, the number average molecular weight of 50,000 or less allows the component (D) to have a suitably low viscosity and thus to have an excellent impregnating property in the carbon fiber (A) and the organic fiber (B) contained in a molded article, and makes it possible to further enhance the dispersibility of the carbon fiber (A) and organic fiber (B) in the molded article. The number average molecular weight is more preferably 3,000 or less. In this regard, the number average molecular weight of such a compound can be measured by gel permeation chromatography (GPC).

The component (D) preferably undergoes a loss of 5 wt % or less when heated at 10° C./minute (in air) in molding temperature. The loss on heating is more preferably 3 wt % or less. Such a loss of 5 wt % or less on heating makes it possible to suppress generation of decomposition gas when the carbon fiber (A) and the organic fiber (B) are impregnated with the component (D), and to suppress generation of voids in molding. In addition, the generation of gas can be suppressed particularly in molding at high temperature.

In this regard, a loss on heating in the present invention refers to a weight loss rate of the weight that the component (D) has before heating to the weight after heating under the above-mentioned heating conditions, assuming that the weight that the component (D) has before heating is 100%. Then, the loss on heating can be determined using the following equation. The weights before and after heating can be determined by measuring the weights at molding temperature by thermogravimetric analysis (TGA) using a platinum sample pan under the condition: a heating speed of 10° C./minute under an air atmosphere.

Loss on heating[wt %]={(weight before heating−weight after heating)/weight before heating}×100.

In addition, the component (D) preferably has a melt viscosity variation rate of 2% or less after heating at 200° C. for two hours. Even in producing a composite fiber bundle (E) for many hours, allowing the melt viscosity variation rate to be 2% or less makes it possible to suppress the adhesion nonuniformity and the like and produce the composite fiber bundle (E) stably. The melt viscosity variation rate is more preferably 1.5% or less, still more preferably 1.3% or less.

Here, the melt viscosity variation rate of the component (D) can be determined by the following method. First, the melt viscosity at 200° C. is measured using a viscoelasticity measurement device with a 40 mm parallel plate at 0.5 Hz. Then, the component (D) is left to stand in a hot air dryer at 200° C. for two hours, followed by measuring the melt viscosity at 200° C. in the same manner, and the viscosity variation rate is calculated using the following equation.

Melt viscosity variation rate [%]={|(melt viscosity at 200° C. before heating at 200° C. for two hours−melt viscosity at 200° C. after heating at 200° C. for two hours)|/(melt viscosity at 200° C. before heating at 200° C. for two hours)}×100.

In the present invention, an epoxy resin preferably used as the component (D) refers to a compound which has two or more epoxy groups and which contains substantially no curing agent and is not cured by what is called three-dimensional cross-linking even if heated. An epoxy resin has an epoxy group, and thus, interacts with the carbon fiber (A) and the organic fiber (B) easily. Because of this, an epoxy resin is well suited for the carbon fiber (A) and the organic fiber (B) which form the composite fiber bundle (E) during impregnation. In addition, an epoxy resin further enhances the dispersibility of the carbon fiber (A) and the organic fiber (B) during molding.

Here, examples of epoxy resins to be preferably used as the component (D) include glycidyl ether epoxy resins, glycidyl ester epoxy resins, glycidyl amine epoxy resins, and alicyclic epoxy resins. These may be used in combination of two or more kinds thereof.

Examples of glycidyl ether epoxy resins include bisphenol A epoxy resins, bisphenol F epoxy resins, bisphenol AD epoxy resins, halogenated bisphenol A epoxy resins, bisphenol S epoxy resins, resorcinol epoxy resins, hydrogenated bisphenol A epoxy resins, phenol novolac epoxy resins, cresol novolac epoxy resins, aliphatic epoxy resins having an ether bond, naphthalene epoxy resins, biphenyl epoxy resins, biphenylaralkyl epoxy resins, dicyclopentadiene epoxy resins, and the like.

Examples of glycidyl ester epoxy resins include hexahydrophthalic acid glycidyl esters, dimer acid diglycidyl esters, and the like.

Examples of glycidyl amine epoxy resins include triglycidyl isocyanurate, tetraglycidyl diaminodiphenylmethane, tetraglycidyl metaxylenediamine, aminophenol epoxy resins, and the like.

Examples of alicyclic epoxy resins include 3,4-epoxy-6-methylcyclohexylmethyl carboxylate, 3,4-epoxycyclohexylmethyl carboxylate, and the like.

Among these, glycidyl ether epoxy resins have an excellent balance between viscosity and heat resistance, and thus, is preferable. Bisphenol A epoxy resins and bisphenol F epoxy resins are more preferable.

In addition, an epoxy resin to be used as the component (D) preferably has a number average molecular weight of 200 to 5000. An epoxy resin having a number average molecular weight of 200 or more makes it possible to enhance the mechanical properties of the molded article further. The number average molecular weight is more preferably 800 or more, still more preferably 1000 or more. On the other hand, an epoxy resin having a number average molecular weight of 5000 or less allows the resin to have an excellent impregnating property for the carbon fiber (A) and the organic fiber (B) constituting the composite fiber bundle (E), and makes it possible to further enhance the dispersibility of the carbon fiber (A) and organic fiber (B) in a molded article. The number average molecular weight is more preferably 4000 or less, still more preferably 3000 or less. In this regard, the number average molecular weight of an epoxy resin can be measured by gel permeation chromatography (GPC).

In addition, examples of terpene resins include polymers or copolymers obtained by polymerizing a terpene monomer with an aromatic monomer and the like, if necessary, in the presence of a Friedel-Crafts catalyst in an organic solvent.

Examples of terpene monomers include α-pinene, β-pinene, dipentene, d-limonene, myrcene, allo-ocimene, ocimene, α-phellandrene, α-terpinene, γ-terpinene, terpinolene, 1,8-cineol, 1,4-cineol, α-terpineol, β-terpineol, γ-terpineol, sabinene, para-menthadienes, carenes, and the like. In addition, examples of aromatic monomers include styrene, α-methylstyrene, and the like. Among these, α-pinene, β-pinene, dipentene, and d-limonene have excellent compatibility with the thermoplastic resin (C) and thus, are preferable. Furthermore, homopolymers of these terpene monomers are more preferable.

It is also possible to use hydrogenated terpene resins obtained by hydrogenation of these terpene resins and use terpene phenol resins obtained by allowing a terpene monomer to react with a phenol in the presence of a catalyst. Here, phenols that are preferably used have, on the benzene ring of the phenol, one to three substituents of at least one kind selected from the group consisting of alkyl groups, halogen atoms, and a hydroxyl group. Specific examples thereof include cresol, xylenol, ethylphenol, butylphenol, t-butylphenol, nonylphenol, 3,4,5-trimethylphenol, chlorophenol, bromophenol, chlorocresol, hydroquinone, resorcinol, orcinol, and the like. These may be used in combination of two or more kinds thereof. Among these, phenols and cresols are preferable. Among these, hydrogenated terpene resins have excellent compatibility with the thermoplastic resin (C), particularly a polypropylene resin, and thus, are preferable.

In addition, the glass transition temperature of a terpene resin is not limited to any particular value, but is preferably 30 to 100° C. The glass transition temperature of 30° C. or more allows the component (D) to have excellent handling properties during molding. In addition, the glass transition temperature of 100° C. or less makes it possible to suitably suppress the flowability of the component (D) during molding and enhance the moldability.

In addition, a terpene resin used as the component (D) preferably has a number average molecular weight of 200 to 5000. The number average molecular weight of 200 or more makes it possible to enhance the mechanical properties, particularly impact strength, of the molded article. In addition, the number average molecular weight of 5000 or less allows a terpene resin to have a suitably low viscosity and thus to have an excellent impregnating property for the carbon fiber (A) and the organic fiber (B), and makes it possible to further enhance the dispersibility of the carbon fiber (A) and organic fiber (B) in the molded article. In this regard, the number average molecular weight of a terpene resin can be measured by gel permeation chromatography (GPC).

The component (D) content of a molding material according to the present invention is preferably 1 to 20 parts by weight with respect to 100 parts by weight of the total of the carbon fiber (A), the organic fiber (B), the thermoplastic resin (C), and the component (D). The component (D) content of 1 part by weight or more further enhances the flowability of the carbon fiber (A) and the organic fiber (B) in production of the molded article and further enhances the dispersibility. The component (D) content is preferably 2 parts by weight or more, preferably 4 parts by weight or more, more preferably 7 parts by weight or more. On the other hand, the component (D) content of 20 parts by weight or less makes it possible to further enhance the flexural strength, tensile strength, and impact strength of the molded article. The component (D) content is preferably 15 parts by weight or less, more preferably 12 parts by weight or less, still more preferably 10 parts by weight or less.

In a molding material according to the present invention, the carbon fiber (A) and the organic fiber (B) are arranged substantially in parallel in the axial direction, and the lengths of the carbon fiber (A) and the organic fiber (B) are preferably substantially the same as the length of the molding material. Allowing the length of the fiber bundle to be substantially the same as the length of the molding material makes it easier to control the fiber lengths of the carbon fiber (A) and the organic fiber (B) in a molded article produced using the molding material. More specifically, varying the below-mentioned molding conditions makes it possible to more easily control the fiber lengths of the carbon fiber (A) and the organic fiber (B) in a molded article produced using the molding material, and to obtain a molded article having more excellent mechanical properties.

Subsequently, a method of producing a molding material according to the present invention will be described. A molding material according to the present invention can be obtained, for example, by the following method.

First, a roving of the carbon fiber (A) and a roving of the organic fiber (B) are doubled in parallel in the longitudinal direction of the fibers to produce a fiber bundle having the carbon fiber (A) and the organic fiber (B). Then, the fiber bundle is impregnated with a melted component (D) to produce the composite fiber bundle (E). Furthermore, the composite fiber bundle (E) is introduced into an impregnation die filled with a melted composition containing the thermoplastic resin (C) to coat the external side of the composite fiber bundle (E) with the composition containing the thermoplastic resin (C), and the resulting material is pulled out through a nozzle. The material is solidified by cooling and pelletized to a predetermined length to obtain a molding material. This is an example of a method of obtaining a molding material (an aspect I). The thermoplastic resin (C) may be contained in the composite fiber bundle (E) through impregnation as long as the resin is contained in at least the external side of the fiber bundle.

In addition, the composite fiber bundle (E) produced by the above-mentioned method may be pellet-blended with a molding material having a coating of the composition containing the thermoplastic resin (C) and with pellets containing the thermoplastic resin (C) (pellets not containing the carbon fiber (A) or the organic fiber (B)) to obtain a molding material mixture (an aspect II). In this case, the carbon fiber (A) content and organic fiber (B) content of a molded article can be easily adjusted. In addition, a molding material obtained by coating the carbon fiber (A) with a composition containing the thermoplastic resin (C) may be pellet-blended with a molding material obtained by coating the organic fiber (B) with a composition containing the thermoplastic resin (C) to obtain a molding material mixture (an aspect III). The carbon fiber (A) and/or the organic fiber (B) are/is preferably impregnated with the component (D). It is more preferable that the carbon fiber (A) is impregnated with the component (D), and that the organic fiber (B) is impregnated with the below-mentioned component (G). Here, pellet-blending is different from melt-kneading and refers to allowing a plurality of materials to be mixed by stirring at a temperature at which a resin component is not melted and to become substantially uniform. Pellet-blending is preferably used for a molding material in pellet form mainly in injection molding, extrusion molding, and the like.

A molding material mixture in the aspect III will be described in further detail. To obtain a molding material mixture, it is preferable that a carbon fiber reinforced thermoplastic resin molding material (X) (referred to as a "carbon fiber reinforced molding material (X)" in some cases) containing at least the thermoplastic resin (C), the carbon fiber (A), and the component (D) and an organic fiber reinforced thermoplastic resin molding material (Y) (referred to as an "organic fiber reinforced molding material (Y)" in some cases) containing at least a thermoplastic resin (F), the organic fiber (B), and a component (G) (referred to as a "component (G)" in some cases) are separately prepared, and that these are pellet-blended. It is preferable that the carbon fiber reinforced molding material (X) contains a composite fiber bundle (H) obtained by impregnating the carbon fiber (A) with the component (D), and has a structure in which the thermoplastic resin (C) is contained in the external side of the composite fiber bundle (H). The carbon fiber (A) preferably has substantially the same length as the carbon fiber reinforced molding material. The carbon fiber (A) is preferably arranged substantially in parallel in the axial direction of the carbon fiber reinforced molding material (X). The carbon fiber reinforced molding material (X) preferably has a length of 3 mm or more, more preferably 7 mm or more. The carbon fiber reinforced molding material (X) preferably has a length of 30 mm or less. In addition, the organic fiber reinforced molding material (Y) preferably contains a composite fiber bundle (I) obtained by impregnating the organic fiber (B) with the component (G), and has a structure in which the thermoplastic resin (F) is contained in the external side of the composite fiber bundle (I). The organic fiber (B) preferably has substantially the same length as the organic fiber reinforced molding material. The organic fiber (B) is preferably arranged substantially in parallel in the axial direction of the organic fiber reinforced molding material (Y). The organic fiber reinforced molding material (Y) preferably has a length of 3 mm or more, more preferably 7 mm or more. The carbon fiber reinforced molding material (Y) preferably has a length of 30 mm or less. In this regard, the compounds enumerated as the component (D) described above can be used as the component (G), and the component (D) and the component (G) may be the same compound or different compounds. The resins enumerated as the thermoplastic resin (C) described above can be used as the thermoplastic resin (F), and the thermoplastic resin (C) and the thermoplastic resin (F) may be the same compound or different compounds.

The carbon fiber reinforced molding material (X) preferably contains 5 to 45 parts by weight of the carbon fiber (A), 10 to 94 parts by weight of the thermoplastic resin (C), and 1 to 20 parts by weight of the component (D) with respect to 100 parts by weight of the total of the carbon fiber (A), the thermoplastic resin (C), and the component (D). The organic fiber reinforced molding material (Y) preferably contains 1 to 45 parts by weight of the organic fiber (B), 10 to 98 parts by weight of the thermoplastic resin (F), and 1 to 20 parts by weight of the component (G) with respect to 100 parts by weight of the total of the organic fiber (B), the thermoplastic resin (F), and the component (G).

It is preferable to blend 50 to 80 parts by weight of the carbon fiber reinforced molding material (X) and 20 to 50 parts by weight of the organic fiber reinforced molding material (Y) with respect to 100 parts by weight of the total of the carbon fiber reinforced molding material (X) and the organic fiber reinforced molding material (Y). That is, in cases where a pellet blend (mixture) of the carbon fiber reinforced molding material (X) and the organic fiber reinforced molding material (Y) is produced, such a pellet blend is preferably prepared in such a manner that the whole mixture contains 5 to 45 parts by weight of the carbon fiber (A), 1 to 45 parts by weight of the organic fiber (B), 10 to 93 parts by weight of the thermoplastic resin (C), and 1 to 20 parts by weight of the component (D) with respect to 100 parts by weight of the total of the carbon fiber (A), the organic fiber (B), the thermoplastic resin (C), and the component (D). In this regard, such ratios are calculated, using, in place of the thermoplastic resin (C), a thermoplastic resin to be used as the thermoplastic resin (F), and using the component (G) in place of the component (D) if the component (G) is used as a component corresponding to the component (D).

Next, a method of producing a molded article according to the present invention will be described. Using the above-mentioned molding material according to the present invention for molding makes it possible to obtain a molded article having excellent dispersibility of the carbon fiber (A) and the organic fiber (B) and excellent flexural strength and impact strength. Preferable examples of molding methods include a molding method carried out using a mold, and various molding methods such as injection molding, extrusion molding, and press molding can be used. In particular, molding methods carried out using an injection molding machine make it possible to obtain molded articles continuously and stably. Examples of preferable injection molding conditions include, but are not limited particularly to: an injection time of 0.5 seconds to 10 seconds, more preferably 2 seconds to 10 seconds; a back pressure of 0.1 MPa to 10 MPa, more preferably 2 MPa to 8 MPa; a dwelling pressure of 1 MPa to 50 MPa, more preferably 1 MPa to 30 MPa; a dwell time of 1 second to 20 seconds, more preferably 5 seconds to 20 seconds; a cylinder temperature of 200° C. to 320° C.; and a mold temperature of 20° C. to 100° C. Here, cylinder temperature refers to the temperature of that portion of an injection molding machine which melts a molding material by heating, and mold temperature refers to the temperature of a mold into which a resin is injected to be formed in predetermined form. Suitably selecting these conditions, particularly injection time, back pressure, and mold temperature, makes it possible to easily adjust the fiber lengths of the carbon fiber and organic fiber in a molded article.

A molded article according to the present invention has excellent mechanical properties, particularly flexural strength and impact strength. More specifically, a molded article according to the present invention preferably has a flexural strength of 140 MPa or more and 300 MPa or less. The flexural strength of 140 MPa or more enables the molded article to have higher durability. The flexural strength is more preferably 150 MPa or more, still more preferably 160 MPa or more. The flexural strength of 300 MPa or less enhances the impact strength of the molded article, and thus, is preferable. Here, the flexural strength can be measured in accordance with ISO178.

A molded article according to the present invention preferably has an impact strength of 25 $kJ/m^2$ or more and 50 $kJ/m^2$ or less. The impact strength of 25 $kJ/m^2$ or more enables the molded article to have higher durability. The impact strength is more preferably 27 $kJ/m^2$ or more, still more preferably 29 $kJ/m^2$ or more. The impact strength of 50 $kJ/m^2$ or less enhances the flexural strength, and thus, is preferable. Here, the impact strength can be measured by carrying out a Charpy V-notch impact test in accordance with ISO179.

Examples of methods of allowing a molded article to have a flexural strength or an impact strength in the above-mentioned range include methods allowing the organic fiber (B) to have a strand strength in the above-mentioned range, methods of allowing the interfacial shear strength to be in the above-mentioned range, methods of allowing the ratio ($L_{co}/l_{no}$) to be in the above-mentioned range, and the like.

Either of the flexural strength and impact strength of a molded article preferably falls within the above-mentioned range, and both the flexural strength and impact strength preferably fall within the above-mentioned ranges.

Examples of applications of molded articles and molding materials according to the present invention include: automobile parts such as instrument panels, door beams, undercovers, spare tire covers, front ends, structural members, and internal parts; home and office electrical appliances and components such as telephones, facsimiles, VTRs, copy machines, television sets, microwave ovens, acoustic equipment, toiletries, laser discs (registered trademark), refrigerators, and air-conditioners; electrical and electronic equipment members typified by housings used for personal computers, mobile phones, and the like and by keyboard supports for supporting a keyboard in a personal computer; and the like.

EXAMPLES

The present invention will be more specifically described with reference to the following Examples, but the present invention is not limited to the description of these Examples. First, the evaluation methods of various characteristics used in the Examples will be described.

(1) Measurement of Number Average Fiber Length

An ISO type of dumbbell specimen obtained in each of the Examples and Comparative Examples was sandwiched between glass plates, heated on a hot stage set to 200 to 300° C., and uniformly dispersed in film form. The film having the carbon fiber (A) and the organic fiber (B) uniformly dispersed therein was observed using an optical microscope (at 50 to 200×). Randomly selected 1000 carbon fibers (A) and similarly randomly selected 1000 organic fibers (B) were measured for fiber length to calculate the number average fiber lengths using the below-mentioned equation.

Number average fiber length=$\Sigma(Mi)/N$

Mi: fiber length (mm)
N: number of fibers (2) Measurement of Flexural Strength of Molded Article The ISO type of dumbbell specimen obtained in each of the Examples and Comparative Examples was measured for flexural strength in accordance with ISO178 using a three-point bending test jig (the indenter radius: 5 mm) with the inter-fulcrum distance set to 64 mm under the test condition: a test speed of 2 mm/minute. A tester used was an "INSTRON (registered trademark)" universal tester 5566 (manufactured by Instron Corporation).

(3) Charpy Impact Strength Measurement of Molded Article

A parallel portion was cut out of the ISO type of dumbbell specimen obtained in each of the Examples and Comparative Example was subjected to a Charpy V-notch impact test in accordance with ISO179 using a C1-4-01 tester manufactured by Tokyo Koki Testing Machine Co. Ltd., and the impact strength (kJ/m$^2$) was calculated.

(4) Fiber Dispersibility Evaluation of Molded Article

In each of the Examples and Comparative Examples, an 80 mm×80 mm×2 mm thick specimen was obtained, and the number of undispersed carbon fiber (CF) bundles present in each of the front and back sides of the specimen was counted through visual observation. Molded articles, 50 sheets, were evaluated. The total number for each of them was rated on the basis of the following criteria for fiber dispersibility, and A and B were regarded as acceptable.
A: less than one undispersed CF bundle
B: one or more undispersed CF bundles
C: three or more undispersed CF bundles (5) Adhesion Evaluation
<First Step>
First, single fiber or fiber bundles were cut to a length easy to handle, and in cases where fiber bundles were used, single fiber were extracted from the fiber bundles.

As depicted in FIG. 1, a single yarn 2 that had been extracted was adhered, in straight form, to a fixing jig 1 using an adhesive 3. After the adhesive was cured, the single yarn was cut in such a manner that the lengths of those portions of the single yarn which were protruded from both ends of the fixing jig 1 became the largest.

Through this step, a single yarn attached to the fixing jig 1 and protruded straight from both ends of the fixing jig 1 was obtained as depicted in FIG. 2. A fiber that was taken out was observed using an optical microscope (at 200×), three points of the fiber were measured for length in the fiber diameter direction, and the average of the measurements was regarded as a fiber diameter df.

<Second Step>
The single yarn 2 obtained in the first step was brought down from above to a thermoplastic resin 6 heated on a heater, and the single yarn 2 was embedded into the resin. During this, a micrometer was used to regulate the embedded depth to approximately 300 μm. The resin having the single yarn 2 embedded therein was cooled to normal temperature, and then, the single yarn was cut at the position up to which the single yarn was protruded several millimeters from the resin. The resulting object together with the base was taken out to obtain a sample depicted in FIG. 3.

<Third Step>
As depicted in FIG. 4, the sample produced in the second step was fixed on the stage of a pull-out tester of a vertical type using the adhesive 3, and tested at a speed of 1 μm/second until the whole fiber was displaced, i.e., pulled out of the resin. During this, the load was measured using a load cell, and the maximum load value was defined as F.

The embedded depth H was determined in accordance with the following Equation using the distance X shown between the base and the tip of the single yarn when the single yarn was embedded, and using the body material height Y shown after the embedding was finished.

$$H = Y - X$$

The interfacial shear strength τ and the critical fiber length $L_c$ were obtained using the following Equation.

$$\tau = F/(\pi \cdot df \cdot H)$$

$$L_c = (\sigma f \times df)/2\tau$$

Here, τ, π, σf, and df represent an interfacial shear strength at the interface between fiber and matrix resin, the circumference ratio, a single fiber strength, and a fiber diameter (a single fiber diameter) respectively, a strand strength was used as the single fiber strength.

The strand strength can be determined in accordance with the resin-impregnated strand testing method described in JIS-R-7608 (2004). In formulation of a resin, CELLOXIDE (registered trademark) 2021P (manufactured by Daicel Corporation), boron trifluoride monoethyl amine (manufactured by Tokyo Chemical Industry Co., Ltd.), and acetone were used at a ratio of 100:3:4 (parts by weight), and the curing conditions: 130° C. and 30 minutes were used. As the fiber diameter df, the value measured by the above-mentioned method was used.

Reference Example 1. Production of Carbon Fiber (A-1)

A copolymer the main component of which was polyacrylonitrile was allowed to undergo spinning, firing treatment, and surface oxidation treatment to obtain a continuous carbon fiber having a total of 24,000 single fibers, a single fiber diameter of 7 μm, a per-unit-length mass of 1.6 g/m, a specific gravity of 1.8 g/cm$^3$, and a surface oxygen concentration ratio [O/C] of 0.2. This continuous carbon fiber had a strand strength of 5000 MPa and a strand tensile modulus of 225 GPa. Subsequently, 2 wt % glycerol polyglycidyl ether as a multi-functional compound was dissolved in water to prepare a sizing agent mother liquid, the sizing agent was applied to the carbon fiber by an immersion method, and the resulting product was dried at 230° C. The adhered amount of the sizing agent in the thus obtained carbon fiber was 1.0 wt %.

Organic Fiber (B)

(B-1)

Polyester fiber ("TETORON (registered trademark)" 1700T-288-702C, manufactured by Toray Industries, Inc., (the single fiber diameter: 23 μm)

(B-2)

Polyester fiber ("TETORON (registered trademark)" 1100T-360-704M, manufactured by Toray Industries, Inc., (the single fiber diameter: 17 μm)

(B-3)

Polyester fiber ("TETORON (registered trademark)" 1700T-144-702C, manufactured by Toray Industries, Inc., (the single fiber diameter: 32 μm)

(B-4)

Liquid crystal polyester fiber ("SIVERAS" (registered trademark) 1700T-288f, manufactured by Toray Industries, Inc., the single fiber fineness: 5.7 dtex, the melting point: 330° C.) was used. (the single fiber diameter: 23 μm)

(B-5)

Liquid crystal polyester fiber having polyglycidyl ether epoxy resin adhered thereto (1 part by weight of polyglycidyl ether epoxy resin applied to 100 parts by weight of "SIVERAS" (registered trademark) 1700T-288f, manufactured by Toray Industries, Inc., (the single fiber diameter: 23 μm))

(B-6)

Para-aramid fiber ("KEVLAR" (registered trademark) 29, manufactured by Du Pont-Toray Co., Ltd., the single fiber fineness: 1.6 dtex, no melting point) was used. (the single fiber diameter: 12 μm)

(B-7)

Polypara-phenylene benzobisoxazole fiber ("ZYLON" (registered trademark), manufactured by Toyobo Co., Ltd.) was used. (the single fiber diameter: 12 μm)

Thermoplastic Resin (C)

(C-1) Polypropylene resin ("PRIME POLYPRO" (registered trademark) J137G, manufactured by Prime Polymer Co., Ltd.)

(C-2) Maleic acid-modified polypropylene resin ("PRIME POLYPRO" (registered trademark) J137G, manufactured by Prime Polymer Co., Ltd./"ADMER" (registered trademark) QE840, manufactured by Mitsui Chemicals, Inc., blended at a weight ratio of 99:1)

(C-3) Maleic acid-modified polypropylene resin ("PRIME POLYPRO" (registered trademark) J137G, manufactured by Prime Polymer Co., Ltd./"ADMER" (registered trademark) QE840, manufactured by Mitsui Chemicals, Inc., blended at a weight ratio of 97:3)

(C-4) Maleic acid-modified polypropylene resin ("PRIME POLYPRO" (registered trademark) J137G, manufactured by Prime Polymer Co., Ltd./"ADMER" (registered trademark) QE840, manufactured by Mitsui Chemicals, Inc., blended at a weight ratio of 95:5)

(C-5) Maleic acid-modified polypropylene resin ("PRIME POLYPRO" (registered trademark) J137G, manufactured by Prime Polymer Co., Ltd./"ADMER" (registered trademark) QE840, manufactured by Mitsui Chemicals, Inc., blended at a weight ratio of 90:10)

(C-6) Maleic acid-modified polypropylene resin ("PRIME POLYPRO" (registered trademark) J137G, manufactured by Prime Polymer Co., Ltd./"ADMER" (registered trademark) QE840, manufactured by Mitsui Chemicals, Inc., blended at a weight ratio of 80:20)

Component (D)

(D-1)

Solid hydrogenated terpene resin ("CLEARON" (registered trademark) P125, manufactured by Yasuhara Chemical Co., Ltd., the softening point: 125° C.)

Example 1

The fiber (A-1) or (B-4) was embedded in the resin (C-1) in accordance with the procedures for the above-mentioned adhesion evaluation, and the resulting sample was used for measurement.

A long fiber reinforced resin pellet production device was used, wherein, in the device, a coating die for a wire coating method was installed at the tip of a TEX-30u twin-screw extruder (the screw diameter: 30 mm, L/D=32) manufactured by Japan Steel Works, Ltd. The above-mentioned thermoplastic resin (C-1) was supplied through the main hopper with the extruder cylinder temperature set to 220° C., and melt-kneaded at a screw rotational speed of 200 rpm. The discharge amount of the component (D) melted by heating at 200° C. was adjusted so as to be 8.7 parts by weight with respect to 100 parts by weight of the total of (A) to (C), and the component (D) was added to a fiber bundle composed of the carbon fiber (A-1) and the organic fiber (B-4) to form the composite fiber bundle (E), which was then supplied into a die mouth (having a diameter of 3 mm) through which a composition containing the melted thermoplastic resin (C-1) was discharged, and continuously arranged so as to cover the peripheries of the carbon fiber (A-1) and the organic fiber (B-4). The obtained strand was cooled and cut to a pellet length of 8 mm using a cutter to produce long fiber pellets. At this time, the take-off speed was adjusted in such a manner that the carbon fiber (A) content was 20 parts by weight, and the organic fiber (B-4) content was 4 parts by weight, with respect to 100 parts by weight of the total of (A) to (C).

The thus obtained long fiber pellets were injection-molded using an injection molding machine (J110AD manufactured by Japan Steel Works, Ltd.) under the conditions: an injection time of 2 seconds, a back pressure of 5 MPa, a dwelling pressure of 20 MPa, a dwell time of 10 seconds, a cylinder temperature of 230° C., and a mold temperature of 60° C., to produce an ISO type of dumbbell specimen and an 80 mm×80 mm×2 mm specimen as molded articles. Here, cylinder temperature refers to the temperature of that portion of an injection molding machine which melts a molding material by heating, and mold temperature refers to the temperature of a mold into which a resin is injected to be formed in predetermined form. The obtained specimens (molded articles) were left to stand for 24 hours in a steady temperature and humidity room adjusted to a temperature of 23° C. and 50% RH, and were used for characteristic evaluation. The evaluation results obtained by the above-mentioned methods are summarized in Table 1.

Examples 2 to 8 and 10

Adhesion evaluation and molded article evaluation were carried out in the same manner as in Example 1 except that the composition and the like were changed as shown in Table 1. The evaluation results are summarized in Table 1.

Example 9

Adhesion evaluation and molded article evaluation were carried out in the same manner as in Example 1 except that the pellets were cut to a length of 4 mm and that the type of the thermoplastic resin (C) was changed to (C-2). The evaluation results are summarized in Table 1.

Comparative Examples 1 to 14

Adhesion evaluation and molded article evaluation were carried out in the same manner as in Example 1 except that the composition and the like were changed as shown in Tables 2 and 3. The evaluation results are summarized in Tables 2 and 3.

Comparative Example 15

Adhesion evaluation and molded article evaluation were carried out in the same manner as in Example 1 except that the molding back pressure for injection molding and the type of the organic fiber (B) or the type of the thermoplastic resin (C) were changed as shown in Table 3. The evaluation results are summarized in Table 3.

TABLE 1

| | | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Raw Material | Carbon Fiber (A) | Type | — | A-1 | A-1 | A-1 | A-1 | A-1 | A-1 | A-1 | A-1 | A-1 | A-1 |
| | | Blended Amount | parts by weight | 20 | 20 | 20 | 20 | 20 | 20 | 10 | 30 | 20 | 20 |
| | | Strand Strength | MPa | 5000 | 5000 | 5000 | 5000 | 5000 | 5000 | 5000 | 5000 | 5000 | 5000 |
| | | Fiber Diameter | μm | 7 | 7 | 7 | 7 | 7 | 7 | 7 | 7 | 7 | 7 |
| | Organic Fiber (B) | Type | — | B-4 | B-4 | B-4 | B-5 | B-6 | B-7 | B-4 | B-4 | B-4 | B-4 |
| | | Blended Amount | parts by weight | 4 | 4 | 4 | 4 | 4 | 4 | 2 | 6 | 4 | 20 |
| | | Strand Strength | MPa | 3500 | 3500 | 3500 | 3500 | 2800 | 5800 | 3500 | 3500 | 3500 | 3500 |
| | | Fiber Diameter | μm | 23 | 23 | 23 | 23 | 12 | 12 | 23 | 23 | 23 | 23 |
| | | Single Fiber Tenacity | cN | 150 | 150 | 150 | 150 | 40 | 70 | 150 | 150 | 150 | 150 |
| | Thermoplastic Resin (C) | Type | — | C-1 | C-2 | C-3 | C-1 | C-3 | C-3 | C-1 | C-1 | C-2 | C-1 |
| | | Blended Amount | parts by weight | 76 | 76 | 76 | 76 | 76 | 76 | 88 | 64 | 76 | 60 |
| | Component (D) | Type | — | D-1 | D-1 | D-1 | D-1 | D-1 | D-1 | D-1 | D-1 | D-1 | D-1 |
| | | Blended Amount | parts by weight | 8.7 | 8.7 | 8.7 | 8.7 | 8.7 | 8.7 | 4.4 | 13.1 | 8.7 | 8.7 |
| Molding Conditions | Back Pressure | | MPa | 5.0 | 5.0 | 5.0 | 5.0 | 5.0 | 5.0 | 5.0 | 5.0 | 5.0 | 5.0 |
| Molded Article | Critical Fiber Length | Lcc | μm | 2800 | 2100 | 1400 | 2800 | 1400 | 1400 | 2800 | 2800 | 2100 | 2800 |
| | | Lco | μm | 8600 | 7200 | 6400 | 8000 | 2700 | 5100 | 8600 | 8600 | 7200 | 8600 |
| | Number Average Fiber Length | lnc | μm | 520 | 530 | 520 | 520 | 520 | 520 | 520 | 520 | 350 | 520 |
| | | lno | μm | 6700 | 6700 | 6700 | 6700 | 2300 | 5200 | 6700 | 6700 | 3700 | 6700 |
| | Lco/lno | — | — | 1.3 | 1.1 | 1.0 | 1.2 | 1.2 | 1.0 | 1.3 | 1.3 | 1.9 | 1.3 |
| | Lcc/Lco | — | — | 0.3 | 0.3 | 0.2 | 0.4 | 0.5 | 0.3 | 0.3 | 0.3 | 0.3 | 0.3 |
| | Interfacial Shear Strength of Component (A) τ | — | MPa | 6.3 | 8.3 | 12.5 | 6.3 | 12.5 | 12.5 | 6.3 | 6.3 | 8.3 | 6.3 |
| | Interfacial Shear Strength of Component (B) τ | — | MPa | 4.7 | 5.6 | 6.3 | 5.0 | 6.2 | 6.8 | 4.7 | 4.7 | 5.6 | 4.7 |
| Evaluation Results | Dispersibility | — | — | A | A | A | A | A | A | A | A | A | B |
| | Charpy Impact Strength | — | kJ/m² | 30 | 30 | 28 | 28 | 23 | 25 | 15 | 34 | 20 | 35 |
| | Flexural Strength | — | MPa | 140 | 150 | 160 | 150 | 160 | 160 | 90 | 150 | 140 | 150 |

TABLE 2

| | | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Raw Material | Inorganic Fiber (A) | Type | — | A-1 | A-1 | A-1 | A-1 | A-1 | A-1 | A-1 | A-1 | A-1 |
| | | Blended Amount | parts by weight | 20 | 20 | 20 | 20 | 20 | 20 | 20 | 20 | 50 |
| | | Strand Strength | MPa | 5000 | 5000 | 5000 | 5000 | 5000 | 5000 | 5000 | 5000 | 5000 |
| | | Fiber Diameter | μm | 7 | 7 | 7 | 7 | 7 | 7 | 7 | 7 | 7 |
| | Organic Fiber (B) | Type | — | B-1 | B-2 | B-2 | B-3 | B-1 | B-4 | B-4 | B-1 | B-4 |
| | | Blended Amount | parts by weight | 4 | 4 | 4 | 4 | 4 | 4 | 4 | 20 | 4 |
| | | Strand Strength | MPa | 1000 | 1000 | 1000 | 1000 | 1000 | 3500 | 3500 | 1000 | 3500 |
| | | Fiber Diameter | μm | 23 | 17 | 17 | 32 | 23 | 23 | 23 | 23 | 23 |
| | | Single Fiber Tenacity | cN | 45 | 25 | 25 | 90 | 45 | 150 | 150 | 45 | 150 |
| | Thermoplastic Resin (C) | Type | — | C-3 | C-3 | C-5 | C-5 | C-1 | C-4 | C-6 | C-3 | C-3 |
| | | Blended Amount | parts by weight | 76 | 76 | 76 | 76 | 76 | 76 | 76 | 60 | 46 |
| | Component (D) | Type | — | D-1 | D-1 | D-1 | D-1 | D-1 | D-1 | D-1 | D-1 | D-1 |
| | | Blended Amount | parts by weight | 8.7 | 8.7 | 8.7 | 8.7 | 8.7 | 8.7 | 8.7 | 9.2 | 8.7 |
| Molding Conditions | Back Pressure | — | MPa | 5.0 | 5.0 | 5.0 | 5.0 | 5.0 | 5.0 | 5.0 | 5.0 | 5.0 |
| Molded Article | Critical Fiber Length | Lcc | μm | 1400 | 1400 | 790 | 790 | 2800 | 1000 | 800 | 1400 | 1400 |
| | | Lco | μm | 3800 | 2600 | 2200 | 5000 | 4300 | 5500 | 2400 | 3800 | 6400 |
| | Number Average Fiber Length | lnc | μm | 550 | 520 | 530 | 510 | 520 | 520 | 540 | 550 | 410 |
| | | lno | μm | 3900 | 3000 | 2800 | 2800 | 3900 | 6700 | 6700 | 3900 | 3900 |
| | Lco/lno | — | — | 1.0 | 0.9 | 0.8 | 1.8 | 1.1 | 0.8 | 0.4 | 1.0 | 1.6 |
| | Lcc/Lco | — | — | 0.4 | 0.5 | 0.4 | 0.2 | 0.7 | 0.2 | 0.3 | 0.4 | 0.2 |
| | Interfacial Shear Strength of Component (A) τ | — | MPa | 12.5 | 12.5 | 22.2 | 22.2 | 6.3 | 17.5 | 21.9 | 12.5 | 12.5 |
| | Interfacial Shear Strength of Component (B) τ | — | MPa | 3.0 | 3.3 | 3.9 | 3.2 | 2.7 | 7.3 | 16.8 | 3.0 | 6.3 |
| Evaluation Results | Dispersibility | — | — | A | A | A | A | A | A | A | B | C |
| | Charpy Impact Strength | — | kJ/m² | 26 | 20 | 18 | 18 | 28 | 16 | 15 | 28 | 5 |
| | Flexural Strength | — | MPa | 160 | 160 | 190 | 190 | 120 | 190 | 200 | 140 | 230 |

TABLE 3

| | | | | Comparative Example 10 | Comparative Example 11 | Comparative Example 12 | Comparative Example 13 | Comparative Example 14 | Comparative Example 15 |
|---|---|---|---|---|---|---|---|---|---|
| Raw Material | Inorganic Fiber (A) | Type | — | A-1 | — | A-1 | A-1 | A-1 | A-1 |
| | | Blended Amount | parts by weight | 20 | — | 10 | 10 | 30 | 20 |
| | | Strand Strength | MPa | 5000 | — | 5000 | 5000 | 5000 | 5000 |
| | | Fiber Diameter | μm | 7 | — | 7 | 7 | 7 | 7 |
| | Organic Fiber (B) | Type | — | — | B-4 | — | B-1 | — | B-4 |
| | | Blended Amount | parts by weight | — | 4 | — | 2 | — | 4 |
| | | Strand Strength | MPa | — | 3500 | — | 1000 | — | 3500 |
| | | Fiber Diameter | μm | — | 23 | — | 23 | — | 23 |
| | | Single Fiber Tenacity | cN | — | 150 | — | 45 | — | 150 |
| | Thermoplastic Resin (C) | Type | — | C-3 | C-3 | C-1 | C-1 | C-1 | C-3 |
| | | Blended Amount | parts by weight | 80 | 96 | 90 | 88 | 70 | 76 |
| | Component (D) | Type | — | D-1 | D-1 | D-1 | D-1 | D-1 | D-1 |
| | | Blended Amount | parts by weight | 7.3 | 1.5 | 4.4 | 4.4 | 13.1 | 8.7 |

TABLE 3-continued

| | | | | Comparative Example 10 | Comparative Example 11 | Comparative Example 12 | Comparative Example 13 | Comparative Example 14 | Comparative Example 15 |
|---|---|---|---|---|---|---|---|---|---|
| Molding Conditions | Back Pressure | — | MPa | 5.0 | 5.0 | 5.0 | 5.0 | 5.0 | 30.0 |
| Molded Article | Critical Fiber Length | $L_{cc}$ | μm | 1400 | — | 2800 | 2800 | 2800 | 1400 |
| | | $L_{co}$ | μm | — | 6400 | — | 4300 | — | 6400 |
| | Number Average Fiber Length | $l_{nc}$ | μm | 550 | — | 520 | 520 | 520 | 150 |
| | | $l_{no}$ | μm | — | 3900 | — | 3900 | — | 3000 |
| | $L_{co}/l_{no}$ | — | — | — | 1.6 | — | 1.1 | — | 2.1 |
| | $L_{cc}/L_{co}$ | — | — | — | — | — | 0.7 | — | 0.2 |
| | Interfacial Shear Strength of Component (A) τ | — | MPa | 12.5 | — | 6.3 | 6.3 | 6.3 | 12.5 |
| | Interfacial Shear Strength of Component (B) τ | — | MPa | — | 6.3 | — | 2.7 | — | 6.3 |
| Evaluation Results | Dispersibility | — | — | A | A | A | A | A | A |
| | Charpy Impact Strength | — | kJ/m² | 5 | 7 | 5 | 12 | 10 | 16 |
| | Flexural Strength | — | MPa | 160 | 80 | 90 | 90 | 150 | 120 |

All molded articles in Examples 1 to 10 each exhibited high flexural strength and impact strength because the ratio $L_{co}/l_{no}$ of the organic fiber was in a specific range, and the strand strength of the organic fiber and the interfacial shear strength between the organic fiber and the thermoplastic resin were each in a specific range. In contrast, the organic fibers in Comparative Examples 1 to 4, 8, and 13 each had a strand strength of less than 1500 MPa, with the result that the impact strength was low. In Comparative Example 5, the interfacial shear strength between the organic fiber (B) and the thermoplastic resin (C) was less than 3.0 MPa, and thus, the flexural strength was insufficient. In Comparative Examples 6 and 7, the ratio $L_{co}/l_{no}$ was less than 0.9, with the result that the impact strength was low. In Comparative Example 9 in which the carbon fiber (A) content was larger, the carbon fibers (A) were entangled with one another, the fiber dispersibility was poor, and the organic fiber was fractured in the molded article, with the result that the impact strength was low. Comparative Examples 10, 12, and 14 each did not include the organic fiber (B), with the result that the impact strength was low. Comparative Example 11 did not include the carbon fiber (A), with the result that the impact strength and flexural strength were low. In Comparative Example 15, the higher back pressure during molding caused the organic fiber (B) to have a shorter fiber length, and the ratio $L_{co}/l_{no}$ was not satisfied, with the result that the impact strength was low.

REFERENCE SIGNS LIST

1: Fixing Jig
2: Single Fiber
3: Adhesive
4: Central Line
5: Base
6: Thermoplastic Resin
7: Vertically Movable Portion
8: XY Stage
9: Base
10: Single Fiber Adhering Jig of Pull-out Tester

The invention claimed is:

1. A fiber reinforced thermoplastic resin molded article, comprising:
a carbon fiber (A),
an organic fiber (B) having a strand strength of 1500 MPa or more and,
a thermoplastic resin (C),
wherein said fiber reinforced thermoplastic resin molded article contains 5 to 45 parts by weight of said carbon fiber (A), 1 to 45 parts by weight of said organic fiber (B), and 20 to 94 parts by weight of said thermoplastic resin (C) with respect to 100 parts by weight of the total of said carbon fiber (A), said organic fiber (B), and said thermoplastic resin (C),
wherein a ratio ($L_{co}/l_{no}$) of the critical fiber length $L_{co}$ of said organic fiber (B) to the number average fiber length $l_{no}$ of said organic fiber (B) is 0.9 or more and 2.0 or less, and
wherein an interfacial shear strength between said organic fiber (B) and said thermoplastic resin (C) is 3.0 MPa or more and 50 MPa or less.

2. The fiber reinforced thermoplastic resin molded article according to claim 1, wherein said organic fiber (B) has a single fiber tenacity of 50 cN or more.

3. The fiber reinforced thermoplastic resin molded article according to claim 1, wherein a ratio ($L_{cc}/L_{co}$) of the critical fiber length $L_{cc}$ of said carbon fiber (A) to the critical fiber length $L_{co}$ of said organic fiber (B) is 0.1 or more and 0.4 or less.

4. The fiber reinforced thermoplastic resin molded article according to claim 1, wherein said organic fiber (B) is at least one selected from the group consisting of liquid crystalline polyester fibers, aramid fibers, and poly(paraphenylenebenzoxazole) fibers.

5. The fiber reinforced thermoplastic resin molded article according to claim 1, wherein said thermoplastic resin (C) is at least one selected from the group consisting of polypropylene resins, polyester resins, and polyarylene sulfide resins.

6. The fiber reinforced thermoplastic resin molded article according to claim 1, wherein said organic fiber (B) has a number average fiber length $l_{no}$ of 2000 m or more and 15000 m or less.

7. The fiber reinforced thermoplastic resin molded article according to claim 2, wherein a ratio ($L_{cc}/L_{co}$) of the critical fiber length $L_{cc}$ of said carbon fiber (A) to the critical fiber length $L_{co}$ of said organic fiber (B) is 0.1 or more and 0.4 or less.

8. The fiber reinforced thermoplastic resin molded article according to claim 2, wherein said organic fiber (B) is at least one selected from the group consisting of liquid crystalline polyester fibers, aramid fibers, and poly(paraphenylenebenzoxazole) fibers.

9. The fiber reinforced thermoplastic resin molded article according to claim 2, wherein said thermoplastic resin (C) is at least one selected from the group consisting of polypropylene resins, polyester resins, and polyarylene sulfide resins.

10. The fiber reinforced thermoplastic resin molded article according to claim 2, wherein said organic fiber (B) has a number average fiber length $l_{no}$ of 2000 μm or more and 15000 μm or less.

* * * * *